United States Patent
Tsuda

(10) Patent No.: US 9,949,197 B2
(45) Date of Patent: Apr. 17, 2018

(54) INFORMATION PROCESSOR, COMMUNICATION SYSTEM AND METHOD

(71) Applicant: Sony Corporation, Tokyo (JP)

(72) Inventor: Shinichiro Tsuda, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/409,083

(22) PCT Filed: Mar. 14, 2013

(86) PCT No.: PCT/JP2013/057134
§ 371 (c)(1),
(2) Date: Dec. 18, 2014

(87) PCT Pub. No.: WO2014/002533
PCT Pub. Date: Jan. 3, 2014

(65) Prior Publication Data
US 2015/0257071 A1 Sep. 10, 2015

(30) Foreign Application Priority Data
Jun. 25, 2012 (JP) .................. 2012-142119

(51) Int. Cl.
*H04W 36/30* (2009.01)
*H04W 48/16* (2009.01)
(Continued)

(52) U.S. Cl.
CPC ........... *H04W 36/30* (2013.01); *H04L 5/0048* (2013.01); *H04L 5/0057* (2013.01); *H04W 4/001* (2013.01); *H04W 4/003* (2013.01); *H04W 48/16* (2013.01); *H04W 48/18* (2013.01); *H04W 72/0453* (2013.01); *H04W 36/14* (2013.01); *H04W 88/08* (2013.01)

(58) Field of Classification Search
CPC ...... H04W 36/30; H04W 36/14; H04W 48/16
See application file for complete search history.

(56) References Cited

U.S. PATENT DOCUMENTS 8,089,939 B1 * 1/2012 Mater .................. H04W 36/30
370/332
8,620,308 B2 * 12/2013 Maria ..................... H04L 12/66
370/328

(Continued)

FOREIGN PATENT DOCUMENTS

JP     2004-356815 A    12/2004
JP     2007-505531 A     3/2007

(Continued)

*Primary Examiner* — Muthuswamy Manoharan
(74) *Attorney, Agent, or Firm* — Chip Law Group

(57) ABSTRACT

A connection right to connect to a base station is appropriately switched. An information processor includes an acquisition unit and a control unit. Here, the acquisition unit obtains a communication quality of wireless communication at a position where a wireless communication apparatus exists. Also, the control unit switches the connection right to connect the wireless communication apparatus to the base station by using the wireless communication based on the communication quality obtained by the acquisition unit (the communication quality of the wireless communication at the position where the wireless communication apparatus exists).

15 Claims, 23 Drawing Sheets

(51) Int. Cl.
*H04L 5/00* (2006.01)
*H04W 72/04* (2009.01)
*H04W 4/00* (2018.01)
*H04W 48/18* (2009.01)
*H04W 36/14* (2009.01)
*H04W 88/08* (2009.01)

(56) References Cited

U.S. PATENT DOCUMENTS

| | | | | |
|---|---|---|---|---|
| 8,750,178 B2* | 6/2014 | Wietfeldt | ............ | H04W 76/025 370/310 |
| 2003/0003933 A1* | 1/2003 | Deshpande | ............. | H04L 29/06 455/510 |
| 2005/0148321 A1* | 7/2005 | Igarashi | ................. | H04L 63/08 455/411 |
| 2007/0064647 A1 | 3/2007 | Prasad | | |
| 2007/0249352 A1 | 10/2007 | Song et al. | | |
| 2008/0085707 A1* | 4/2008 | Fadell | ................... | H04W 8/065 455/435.3 |
| 2009/0061862 A1* | 3/2009 | Alberth, Jr. | ........... | H04W 48/16 455/434 |
| 2010/0113018 A1 | 5/2010 | Furumi | | |
| 2010/0234042 A1* | 9/2010 | Chan | ................. | H04W 36/0061 455/453 |
| 2011/0039579 A1* | 2/2011 | Karjalainen | .......... | H04W 4/001 455/456.1 |
| 2012/0129517 A1* | 5/2012 | Fox | .................... | H04L 41/5025 455/425 |
| 2012/0252435 A1* | 10/2012 | Bienas | ................. | H04W 24/02 455/422.1 |

FOREIGN PATENT DOCUMENTS

| | | |
|---|---|---|
| JP | 2008-085907 A | 4/2008 |
| JP | 2008-258809 A | 10/2008 |
| JP | 2009-531952 A | 9/2009 |
| JP | 2011-176722 A | 9/2011 |

* cited by examiner

FIG. 3
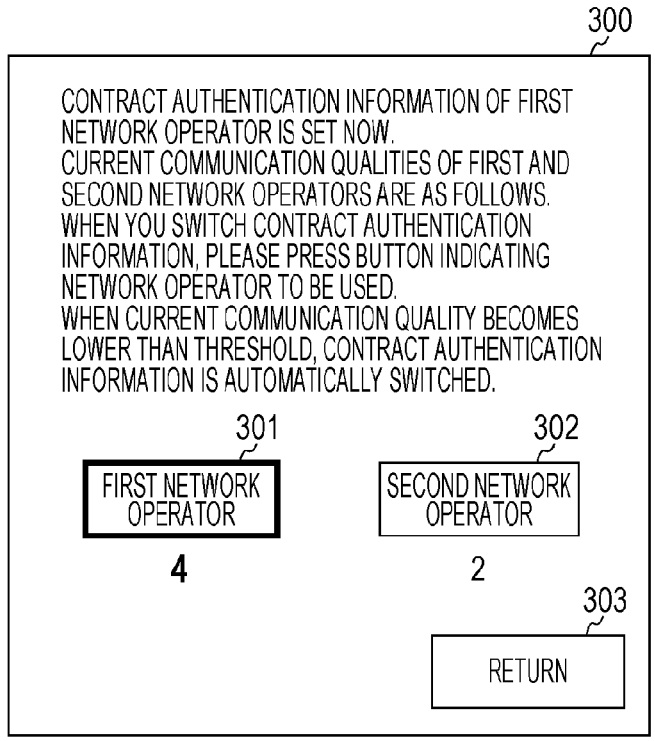
a
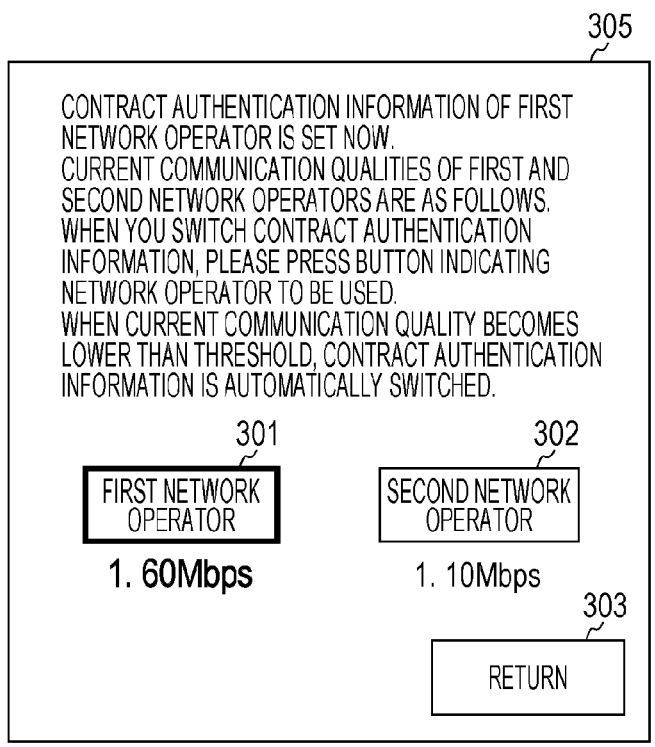
b

FIG. 4
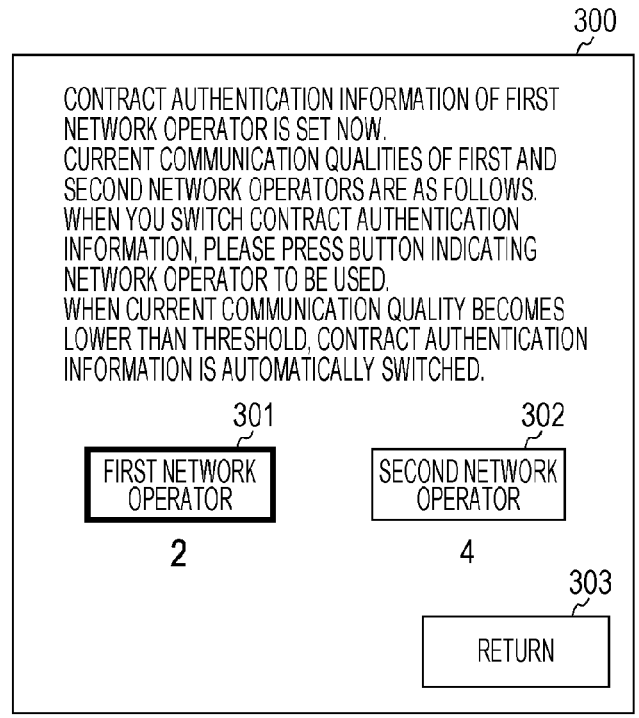
a
⇓ SWITCH TO SECOND NETWORK OPERATOR
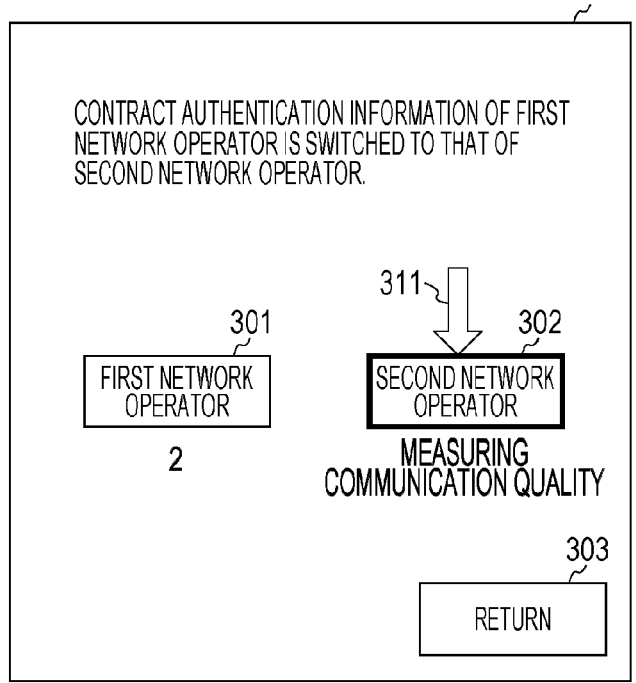
b

FIG. 17

COMMUNICATION QUALITY
INFORMATION STORAGE UNIT
620

| LATITUDE | LONGITUDE | COMMUNICATION QUALITY | | |
|---|---|---|---|---|
| | | FIRST NETWORK OPERATOR | SECOND NETWORK OPERATOR | THIRD NETWORK OPERATOR |
| 34.600 | 135.000 | 4 | 4 | 2 |
| 34.600 | 135.005 | 4 | 4 | 3 |
| 34.600 | 135.010 | 4 | 4 | 3 |
| 34.600 | 135.015 | 4 | 3 | 3 |
| 34.600 | 135.020 | 3 | 3 | 3 |
| 34.600 | 135.025 | 3 | 3 | 4 |
| ⋮ | ⋮ | ⋮ | ⋮ | ⋮ |
| 34.605 | 135.000 | 3 | 2 | 4 |
| 34.605 | 135.005 | 3 | 2 | 4 |

COMMUNICATION QUALITY
INFORMATION STORAGE UNIT
680

682

| TIME PERIOD | 9:00 TO 12:00 |
|---|---|
| 681 LATITUDE / LONGITUDE | NETWORK OPERATOR |

| TIME PERIOD | | 6:00 TO 9:00 | | |
|---|---|---|---|---|
| LATITUDE | LONGITUDE | NETWORK OPERATOR | | |
| | | FIRST NETWORK OPERATOR | SECOND NETWORK OPERATOR | THIRD NETWORK OPERATOR |
| 34.600 | 135.000 | 4 | 4 | 2 |
| 34.600 | 135.005 | 4 | 4 | 3 |
| 34.600 | 135.010 | 4 | 4 | 3 |
| 34.600 | 135.015 | 4 | 3 | 3 |
| 34.600 | 135.020 | 3 | 3 | 3 |
| 34.600 | 135.025 | 3 | 3 | 4 |
| ⋮ | ⋮ | ⋮ | ⋮ | ⋮ |
| 34.605 | 135.000 | 3 | 2 | 4 |
| 34.605 | 135.005 | 3 | 2 | 4 |

685

INFORMATION PROCESSOR, COMMUNICATION SYSTEM AND METHOD

This application is the National Stage of International Application No. PCT/JP2013/057134, filed in the Japanese Patent Office as a Receiving Office on Mar. 14, 2013, which claims priority to Japanese Patent Application Number 2012-142119, filed in the Japanese Patent Office on Jun. 25, 2012, each of which is hereby incorporated by reference in its entirety.

TECHNICAL FIELD

The present technique relates to an information processor. More particularly, the present technique relates to an information processor for performing processing regarding wireless communication, a communication system, an information processing method, and a program which makes a computer perform the method.

BACKGROUND ART

Traditionally, a wireless communication apparatus for connecting to a network such as a public radio network has been widely used. Also, a 3G (third generation) mobile service (referred to as third generation in Japan) has been started since 2002. Initially, a main application of the mobile service has been a small-capacity packet such as sound and a mail. However, a using action of a user is changing to download of comparatively large size packet such as download of a music file and viewing of moving images by introduction of a high speed downlink packet access (HS-DPA) and the like.

Also, for example, it is assumed that users be concentrated in a specific area and the users download large-capacity packets. In this case, since traffics are locally concentrated, it is possible that a sufficient rate cannot be obtained.

Therefore, for example, a technique of a handover which switches base stations by using a communication quality has been proposed (refer to Patent Document 1).

CITATION LIST

Patent Document

Patent Document 1: Japanese Patent Application Laid-Open No. 2011-176722

SUMMARY OF THE INVENTION

Problems to be Solved by the Invention

According to the above-mentioned related art, a handover can be appropriately performed by using a communication quality.

However, in a place where the wireless communication apparatus exists, although the traffics are concentrated in a base station operated by a certain network operator, it is assumed that the traffics be not concentrated in a base station operated by another network operator. In this case, it is important to switch the network operator to an appropriate network operator.

The present technique has been made in consideration of the above situation, and a purpose of the present technique is to appropriately switch a connection right to connect to a base station.

Solutions to Problems

The present technique has been made to solve the above-mentioned problem. The first aspect is an information processor including an acquisition unit for obtaining a communication quality of wireless communication at a position where a wireless communication apparatus exists and a control unit for switching a connection right to connect the wireless communication apparatus to a base station by using the wireless communication based on the obtained communication quality, an information processing method, and a program which makes a computer perform the method. Accordingly, an effect is obtained that the communication quality of the wireless communication at the position where the wireless communication apparatus exists is obtained and the connection right is switched based on the obtained communication quality.

Also, in the first aspect, the control unit may switch from the connection right to another connection right when the communication quality of the wireless communication based on the connection right satisfies a predetermined condition. As a result, an effect is obtained that the connection right is switched to the other connection right when the communication quality of the wireless communication based on the connection right satisfies the predetermined condition.

Also, in the first aspect, the control unit may determine that the communication quality of the wireless communication based on the connection right satisfies the predetermined condition when the communication quality is lower than a threshold as a reference. As a result, an effect is obtained that the control unit may determine that the communication quality of the wireless communication based on the connection right satisfies the predetermined condition when the communication quality is lower than the threshold as the reference.

Also, in the first aspect, the acquisition unit may sequentially obtain the communication qualities regarding the plurality of connection rights for each connection right, and the control unit may switch the connection right to the that regarding the communication quality for satisfying the predetermined condition from among the obtained communication qualities. As a result, an effect is obtained that the communication qualities regarding the plurality of connection rights are sequentially obtained for each connection right and the connection right is switched to the connection right regarding the communication quality for satisfying the predetermined condition from among the obtained communication qualities.

Also, in the first aspect, the control unit may switch the connection right regardless of the obtained communication quality when the position where the wireless communication apparatus exists is out of a communication range. As a result, an effect is obtained that the connection right is switched regardless of the obtained communication quality when the position where the wireless communication apparatus exists is out of the communication range.

Also, in the first aspect, when a state that the wireless communication apparatus is out of the communication range continues for a predetermined period of time, it is possible that the control unit do not switch the connection right until the state that the wireless communication apparatus is out of the communication range is cleared. As a result, an effect is obtained that the connection right is not switched until the state that the wireless communication apparatus is out of the communication range is cleared when the state that the wireless communication apparatus is out of the communication range continues for the predetermined period of time.

Also, in the first aspect, the control unit may change at least one setting of a carrier frequency and a wireless communication system of a wireless communication unit for performing the wireless communication with the base station according to the switching of the connection right. As a result, an effect is obtained that at least one setting of the carrier frequency and the wireless communication system of the wireless communication unit is changed according to the switching of the connection right.

Also, in the first aspect, the control unit makes a hold unit hold the communication quality obtained at the time of or immediately before the switching of the connection right. It may be determined after the switching whether the connection right is switched based on the comparison result between the communication quality obtained after the switching and the communication quality held by the hold unit. As a result, an effect is obtained that the hold unit holds the communication quality obtained at the time of or immediately before the switching of the connection right and it is determined after the switching whether the connection right is switched based on the comparison result between the communication quality obtained after the switching and the communication quality held by the hold unit after the switching.

Also, in the first aspect, the acquisition unit may obtain a value calculated based on a value regarding the strength of a pilot signal, a reference signal, or a beacon signal and a received signal strength as the communication quality. As a result, an effect is obtained that the value calculated based on the value regarding the strength of the pilot signal, the reference signal, or the beacon signal and the received signal strength is obtained as the communication quality.

Also, in the first aspect, the acquisition unit may obtain a value calculated based on a value regarding an energy per chip-to-noise power spectral density (Ec/No), an energy per chip-to-interference power spectral density (Ec/Io), or a signal-to-interference ratio (SIR) as the communication quality. As a result, an effect is obtained that the value calculated based on the value regarding the Ec/No, the Ec/Io, or the SIR is obtained as the communication quality.

Also, in the first aspect, the acquisition unit may obtain a value calculated based on a value regarding a channel quality indicator (CQI) or a data rate control (DRC) as the communication quality. As a result, an effect is obtained that the value calculated based on the value regarding the CQI or the DRC is obtained as the communication quality.

Also, in the first aspect, the acquisition unit may obtain the communication quality included in information provided from another information processor via the base station. As a result, an effect is obtained that the communication quality included in the information provided from the other information processor via the base station is obtained.

Also, in the first aspect, the acquisition unit may obtain the communication quality associated with the position where the wireless communication apparatus exists and stored or a communication quality associated with the position where the wireless communication apparatus exists and the current time and stored. As a result, an effect is obtained that the communication quality associated with the position where the wireless communication apparatus exists and stored or the communication quality associated with the position where the wireless communication apparatus exists and the current time and stored are obtained.

Also, in the first aspect, acquisition processing by the acquisition unit and switching processing by the control unit may be performed in idle mode. As a result, an effect is obtained that the acquisition processing by the acquisition unit and the switching processing by the control unit are performed in idle mode.

Also, in the first aspect, a display control unit may be further included which associates the obtained communication quality with information about the network operator for providing the communication quality and displays it on the display unit. As a result, an effect is obtained that the obtained communication quality is associated with the information about the network operator for providing the communication quality and both of them are displayed.

Also, in the first aspect, the control unit may switch the connection right according to the operation by the user regardless of the obtained communication quality when the operation by the user to switch the connection right has been accepted. As a result, an effect is obtained that the connection right is switched according to the operation by the user regardless of the obtained communication quality when the operation by the user to switch the connection right has been accepted.

Also, in the first aspect, it may be assumed that the connection right be a right to connect to the base station based on the contract authentication information regarding the network operator for operating the base station, and the control unit may switch the connection right by switching the contract authentication information. As a result, an effect is obtained that the connection right is switched by switching the contract authentication information.

Also, a second aspect of the present technique is a communication system including a wireless communication apparatus which includes a wireless communication unit for transmitting a communication quality of wireless communication at a position where a wireless communication apparatus exists to an information processor and a control unit which switches a connection right to connect to a base station by using the wireless communication based on a switching request from the information processor and an information processor for transmitting the switching request to switch the connection right to the wireless communication apparatus based on the communication quality transmitted from the wireless communication apparatus, an information processing method for the same, and a program which allows a computer to execute the method. As a result, an effect is obtained that the wireless communication apparatus transmits the communication quality of the wireless communication at the position where the wireless communication apparatus exists to the information processor and switches the connection right based on the switching request from the information processor and the information processor transmits the switching request to switch the connection right to the wireless communication apparatus based on the communication quality transmitted from the wireless communication apparatus.

Effects of the Invention

According to the present technique, an excellent effect can be obtained that a connection right to connect to a base station can be appropriately switched.

BRIEF DESCRIPTION OF DRAWINGS

FIGS. 3a and 3b are diagrams of exemplary display screens displayed on a display unit 280 according to the first embodiment of the present technique.

FIGS. 4a and 4b are diagrams of exemplary display screens displayed on the display unit 280 according to the first embodiment of the present technique.

FIG. 17 is a diagram of an exemplary database stored in a communication quality information storage unit 620 according to the fourth embodiment of the present technique.

FIG. 20 is a diagram of an exemplary database stored in a communication quality information storage unit 680 according to the fourth embodiment of the present technique.

MODES FOR CARRYING OUT THE INVENTION

A mode for carrying out the present technique (referred to as an embodiment below) will be described below. The description will be in the following order.

1. First embodiment (contract authentication information switch control: example for switching contract authentication information based on a comparison result between a communication quality and a threshold)
2. Second embodiment (contract authentication information switch control: example for switching contract authentication information based on a comparison result between the contract authentication information before switching and that after the switching)
3. Third embodiment (contract authentication information switch control: example for switching contract authentication information based on a comparison result between communication qualities about a plurality of network operators)
4. Fourth embodiment (contract authentication information switch control: example for switching contract authentication information by using the communication quality stored in a wireless communication apparatus)
5. Fifth embodiment (contract authentication information switch control: example for switching contract authentication information of the wireless communication apparatus based on control of an apparatus other than the wireless communication apparatus)

1. First Embodiment

Configuration Example of Communication System

Figure 1:
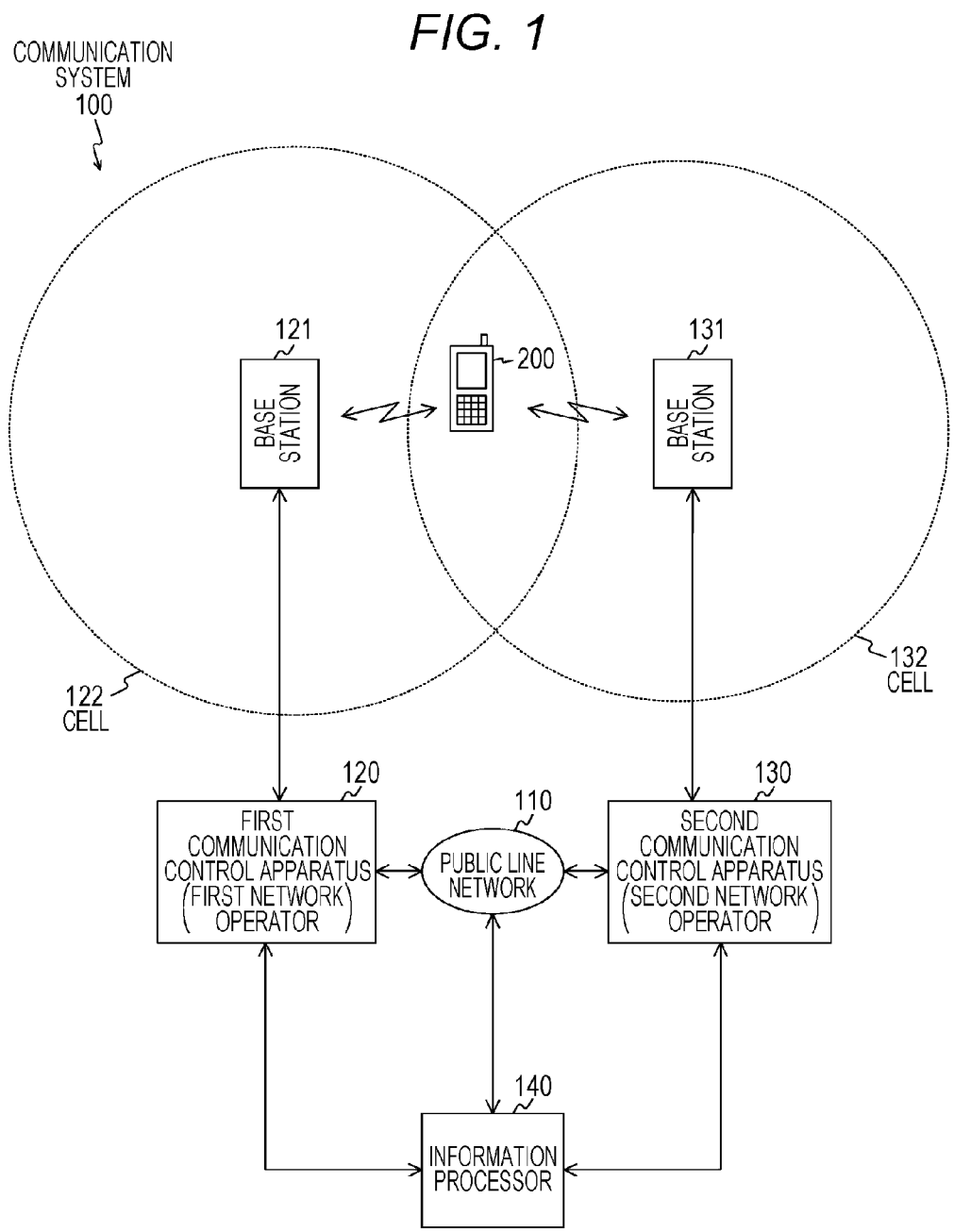
FIG. 1 is a block diagram of an exemplary system structure of a communication system 100 according to a first embodiment of the present technique.

FIG. 1 is a block diagram of an exemplary system structure of a communication system 100 according to a first embodiment of the present technique.

The communication system 100 includes a public line network 110, a first communication control apparatus 120, a second communication control apparatus 130, base stations 121 and 131, an information processor 140, and a wireless communication apparatus 200. The wireless communication apparatus 200 is, for example, a mobile phone apparatus (for example, a mobile phone apparatus and a smartphone having a conversation function and a data communication function), a data communication apparatus having a wireless communication function (for example, a personal computer), and the like. Also, the wireless communication apparatus 200 is an exemplary information processor and wireless communication apparatus described in claims.

The public line network 110 is a public line network such as a telephone network and internet. Also, the public line network 110 is connected to the first communication control apparatus 120 and the second communication control apparatus 130 via a gateway (not shown).

The base station 121 is operated by a first network operator. The base station 121 is a mobile communication base station (NodeB or eNodeB) which connects the wireless communication apparatus holding contract authentication information regarding the first network operator with the first communication control apparatus 120 through a radio line.

Here, the contract authentication information is information necessary for connecting to a wireless communication network managed by the network operator and includes, for example, subscriber information and the like regarding authentication and billing. Also, the contract authentication information includes, for example, telephone subscriber (Subscriber) information and information about an authentication key (Authentication). For example, the contract authentication information is a universal subscriber identity module (USIM).

Also, for example, when valid contract authentication information is set to the wireless communication apparatus 200, it can be grasped as a case where a connection right (rewritable connection right) to connect to a predetermined network (for example, a public line network) by using the wireless communication is set. That is, the connection right is a right to connect to a base station based on the contract authentication information regarding the network operator for operating the base station.

For example, a user who owns the wireless communication apparatus 200 subscribes to the first network operator on a wireless connection service and sets the valid contract authentication information regarding the first network operator to the wireless communication apparatus 200. As a result, the user can use the base station 121 operated by the first network operator. Similarly, the user who owns the wireless communication apparatus 200 subscribes to a second network operator on the wireless connection service and sets the valid contract authentication information regarding the second network operator to the wireless communication apparatus 200. As a result, the user can use the base station 131 operated by the second network operator.

In the embodiments of the present technique, an example in which the USIM is used as the contract authentication information is shown. However, the contract authentication information is not limited to this, and other contract authentication information may be used. For example, a subscriber identity module which can be downloaded as a software (for example, software downloadable SIM) may be used. The SIM which can be downloaded as the software is, for example, a machine communication identity module (MCIM). Also, a rewritable SIM may be used.

The base station 131 is operated by the second network operator. The base station 131 is the mobile communication base station (NodeB or eNodeB) which connects the wireless communication apparatus holding the contract authentication information regarding the second network operator with the second communication control apparatus 130 through the radio line. The first and the second network operators are mobile network operators for providing the wireless connection service.

Also, it is schematically indicated in FIG. 1 that a cell 122 is a range where radio waves of the base station 121 reach (wirelessly communicable range) and a cell 132 is a range where the radio waves of the base station 131 reach (wirelessly communicable range).

In the embodiments of the present technique, it is assumed that the base station include both the base station itself and the cell specified by the base station. For example, in the embodiments of the present technique, it is assumed that a contract to use the base station also include a contract to use the cell specified by the base station.

Also, for easier description, the first and second network operators are shown as the network operator in FIG. 1. However, this can be similarly applied to a case where more than three network operators exist. Also, for easier description, the base stations 121 and 131 are shown as the base station operated by each network operator in FIG. 1. However, this can be similarly applied to a case where there are two or more base stations operated by the respective network operators.

The first communication control apparatus 120 is a communication control apparatus managed by the first network operator for providing the wireless connection service and authenticates and controls the wireless communication apparatus connected via the base station 121. The first communication control apparatus 120 connects the authenticated wireless communication apparatus to the public line network 110 via the gateway (not shown).

The second communication control apparatus 130 is the communication control apparatus managed by the second network operator for providing the wireless connection service and authenticates and controls the wireless communication apparatus connected via the base station 131. The second communication control apparatus 130 connects the authenticated wireless communication apparatus to the public line network 110 via the gateway (not shown).

Here, the first communication control apparatus 120 authenticates a wireless communication apparatus holding the contract authentication information regarding the first network operator from among the wireless communication apparatuses connected via the base station 121 except for a specific case. Also, similarly, the second communication control apparatus 130 authenticates the wireless communication apparatus holding the contract authentication information regarding the second network operator from among the wireless communication apparatuses connected via the base station 131 except for a specific case. The specific case is, for example, a case of a call for emergency (for example, a case of a call to a police station, a fire station, and the like).

Also, the first communication control apparatus 120 outputs various information transmitted from the wireless communication apparatus 200 via the base station 121 to the information processor 140 and transmits various information output from the information processor 140 to the wireless communication apparatus 200 via the base station 121. Similarly, the second communication control apparatus 130 outputs the various information transmitted from the wireless communication apparatus 200 via the base station 131 to the information processor 140 and transmits the various information output from the information processor 140 to the wireless communication apparatus 200 via the base station 131.

The information processor 140 is operated by an operator for providing various communication services. Also, the information processor 140 provides the contract authentication information to the wireless communication apparatus 200 corresponding to a transmission request in response to the transmission request of the contract authentication information from the wireless communication apparatus 200. Here, it is assumed that the operator for providing various communication services be a network operator for providing a wireless connection service, a mobile virtual network operator (MVNO) (an operator of a business which is a so-called virtual network operator), and the like. The information processor 140 will be described in detail with reference to FIG. 7.

Here, it is assumed that a quality regarding the wireless communication (communication quality) with the base station 121 become worse when the wireless communication apparatus 200 is connected to the base station 121. In this case, it is assumed that an appropriate communication service can be used by connecting the wireless communication apparatus 200 to the base station 131, for example, in a case where the communication quality regarding the base station 131 capable of connecting to the wireless communication apparatus 200 is excellent. In the first embodiment of the present technique, an example is shown in which the wireless communication apparatus 200 selects an optimal base station (network operator) and a desired communication service is used via the base station (network operator).

[Configuration Example of Wireless Communication Apparatus]

Figure 2:
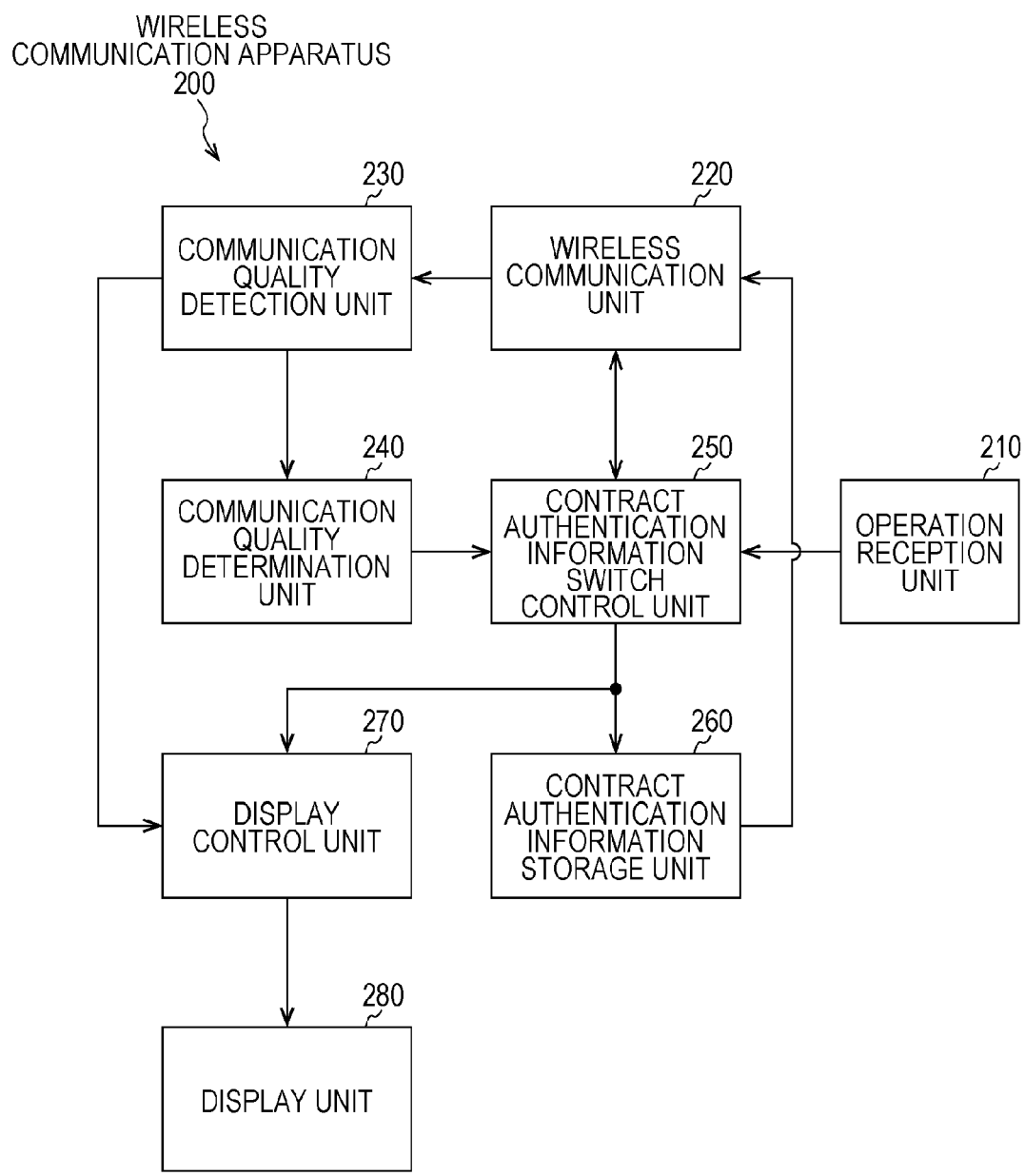
FIG. 2 is a block diagram of an exemplary function structure of a wireless communication apparatus 200 according to the first embodiment of the present technique.

FIG. 2 is a block diagram of an exemplary function structure of the wireless communication apparatus 200 according to the first embodiment of the present technique.

The wireless communication apparatus 200 includes an operation reception unit 210, a wireless communication unit 220, a communication quality detection unit 230, a communication quality determination unit 240, a contract authentication information switch control unit 250, a contract authentication information storage unit 260, a display control unit 270, and a display unit 280.

The operation reception unit 210 receives an operation input operated by the user and outputs a signal according to the received operation input to the contract authentication information switch control unit 250. The operation reception unit 210 includes, for example, various keys such as numeric keys and alphabet keys. Also, the operation reception unit 210 and the display unit 280 can be integrally configured by using a touch panel. A finger of the user contacts with or becomes close to a display surface of the touch panel so as to perform the operation input. For example, the operation reception unit 210 receives selecting operation (switching operation) for selecting a single wireless communication service from among a plurality of wireless communication services displayed on the display unit 280. The selecting operation will be described in detail with reference to FIGS. 3a to 4b.

The wireless communication unit 220 transmits/receives various information (for example, sound data and image data) to/from the base station operated by the network operator (for example, the first and second network operators shown in FIG. 1) by using the wireless communication. For example, the wireless communication unit 220 performs the wireless communication by using a 3G network based on the contract authentication information (valid contract authentication information) stored in the contract authentication information storage unit 260.

The communication quality detection unit 230 receives the radio waves transmitted from the base station and detects the communication quality at a fixed or variable period from the received radio waves. The communication quality detection unit 230 outputs information about the detected communication quality (communication quality information) to the communication quality determination unit 240 and the display control unit 270.

Here, a detection method for detecting the communication quality will be described. For example, strength of a pilot signal, a reference signal, or a beacon signal included in the received radio waves can be used as the communication quality. Also, a ratio between a noise component and an interference component (that is, signal to noise ratio (S/N)) or a signal to interference ratio (SIR) may be used as the communication quality. The SIR may be calculated as a signal to interference and noise ratio (SINR). The SINR is a definition in which the noise component is separated from the interference component. Also, in a case where these are used as the communication quality, the communication quality detection unit 230 obtains these values as the communication quality from the radio waves transmitted from the base station.

Also, the magnitude of the degree of congestion may be used as the communication quality. For example, the degree of the congestion can be detected based on a proportion of the strength of the pilot signal, the reference signal, or the beacon signal relative to a received signal strength indicator (RSSI). In this case, the magnitude of the degree of the congestion can be used as the communication quality.

Here, a received signal code power (RSCP) which is defined by the 3GPP can be used as the strength of the pilot signal, the reference signal, or the beacon signal. Similarly, a reference signal received power (RSRP) can be used. That is, the magnitude of the degree of the congestion can be used as the communication quality by detecting the degree of the congestion based on an energy per chip-to-interference power spectral density (Ec/Io). Similarly, the magnitude of the degree of the congestion can be used as the communication quality by detecting the degree of the congestion based on an energy per chip-to-noise power spectral density (Ec/No). Similarly, the magnitude of the degree of the congestion can be used as the communication quality by detecting the degree of the congestion based on a reference signal received quality (RSRQ).

Here, the Ec/Io and the Ec/No are defined as indicated by the following formula 1. Also, the RSRQ is defined as indicated by the following formula 2.

$$Ec/Io = Ec/No = RSCP/RSSI \qquad \text{formula 1}$$

$$RSRQ = RSRP/RSSI \qquad \text{formula 2}$$

Also, an interference power component is calculated based on the strength of the pilot signal, the reference signal, or the beacon signal from a peripheral cell, and the degree of the congestion may be obtained by using the interference power component. Alternatively, the interference power component is calculated based on a signal to noise power ratio, and the degree of the congestion may be obtained by using the interference power component. That is, a value in which an effect of the interference power component is removed from the value of the Ec/Io, the Ec/No, or the RSRQ may be used as the degree of the congestion so that the interference power component and the degree of the congestion calculated in this way are separated and used.

Here, values calculated by using the formulas 1 and 2 or values which are proportional to these may be used as the communication quality. Also, a signal to noise ratio (SNR) or a signal to interference ratio (SIR) is calculated from the interference power component and the degree of the congestion, and the value of the SNR or the SIR may be used as the communication quality. For example, the degree of the congestion (kcong) is defined as indicated by the following formula 3. However, a is an arbitrary value. For example, it may be assumed that a value of a spreading factor (SF) of the pilot signal be a.

$$Kcong = \sqrt{\{RSSI/(\alpha \cdot RSCP)\}} = \sqrt{[1/\{\alpha(Ec/Io)\}]} \qquad \text{formula 3}$$

Here, for example, a case where the user downloads large data is assumed. In this case, power increases which is distributed to a high-speed downlink shared channel (HS-DSCH) in a code division multiple access system. Alternatively, the power distributed to a resource block in an orthogonal frequency division multiple access system increases. That is, the power of the RSSI increases relative to the power of the RSCP. Therefore, it can be understood that the value of the formula 3 express the degree of the congestion. A calculation formula of the degree of the congestion is not limited to the formula 3, and various modifications are possible within a range which is deviated from the purpose for grasping the degree of the congestion. Also, the SNR of the pilot signal in the code division multiple access system can be approximated as indicated by the following formula 4.

$$SNR=RSCP/\{(RSSI-RSCP)/SF\}=1/\{(RSSI/SF \cdot RSCP)-(1/SF)\}=1/\{kcong^2-(1/SF)\} \quad \text{formula 4}$$

At the time of comparison of the communication qualities, a difference between theoretical maximum rates of the communication services may be added.

In this way, the communication quality detection unit 230 obtains the communication quality of the wireless communication at the position where the wireless communication apparatus 200 exists. In this case, for example, the communication quality detection unit 230 can obtain a value calculated based on the value regarding the strength of the pilot signal, the reference signal, or the beacon signal and the received signal strength as the communication quality. Also, the communication quality detection unit 230 can obtain a value calculated based on the value regarding the Ec/No, the Ec/Io, or the SIR as the communication quality.

Here, when the information about the degree of the congestion is provided from other apparatus (for example, the information processor 140) via the base station, the information about the degree of the congestion included in the signal received by the wireless communication unit 220 may be used as the communication quality. Also, when the information about the degree of the congestion is included in a control signal transmitted from the base station, the information about the degree of the congestion may be obtained from the control signal included in the signal received by the wireless communication unit 220 and may be used as the communication quality. Also, the communication quality detection unit 230 may use a chanel quality Indicator (CQI) used by the wireless communication unit 220 or a data rate control (DRC) as the communication quality. In this way, the communication quality regarding the wireless communication network which is currently selected can be provided to the wireless communication apparatus 200 by using the wireless communication.

In this way, the communication quality detection unit 230 can obtain a value calculated based on a value regarding the CQI or the DRC as the communication quality. Also, the communication quality detection unit 230 can obtain the communication quality included in information provided from the other apparatus via the base station.

In this way, in the embodiments of the present technique, the communication quality can be calculated based on the information regarding the wireless communication detected by the wireless communication unit 220. In the embodiment of the present technique, it is assumed that the communication quality include the degree of the congestion. Also, the communication quality detection unit 230 is an exemplary acquisition unit described in claims.

The communication quality determination unit 240 determines regarding the communication quality detected by the communication quality detection unit 230 and outputs the determination result to the contract authentication information switch control unit 250. For example, the communication quality determination unit 240 performs at least two scales of the determination (for example, whether the communication quality provided by the current network operator satisfies a desired quality) about the communication quality detected by the communication quality detection unit 230. The two-scale determination includes, for example, to determine the communication quality as the communication quality of equal to or lower than two or that of equal to or higher than three after the communication quality detected by the communication quality detection unit 230 has been determined on a scale of one to five (5: good, 1: bad). Also, for the determination of the communication quality, a value may be used in which the communication quality detected by the communication quality detection unit 230 is averaged by an arbitrary period of time (for example, about ten minutes).

The contract authentication information switch control unit 250 controls to switch the contract authentication information stored in the contract authentication information storage unit 260 based on the determination result by the communication quality determination unit 240. For example, the contract authentication information switch control unit 250 controls to switch the contract authentication information in the contract authentication information storage unit 260 when the determination result in which the communication quality provided by the current network operator does not satisfy the desired quality has been output from the communication quality determination unit 240. Also, when the contract authentication information switch control unit 250 has switched the contract authentication information, the contract authentication information switch control unit 250 may notify the display control unit 270 that the contract authentication information switch control unit 250 has switched the contract authentication information.

In this way, the communication quality determination unit 240 switches the contract authentication information to connect the wireless communication apparatus 200 to the base station by using the wireless communication based on the communication quality obtained by the communication quality detection unit 230. That is, the connection right is switched by switching the contract authentication information. Specifically, for example, when the communication quality of the wireless communication based on the current contract authentication information satisfies a predetermined condition, the communication quality determination unit 240 switches the contract authentication information from the current one to the other one. For example, when the communication quality of the wireless communication based on the contract authentication information is lower than a threshold (for example, "three" on the scale of one to five) as a reference, the communication quality determination unit 240 determines that the predetermined condition is satisfied. In the embodiments of the present technique, the switching of the contract authentication information includes both a switching of the network operator and a switching of the connection right. Also, the contract authentication information switch control unit 250 is an exemplary control unit described in claims.

The contract authentication information storage unit 260 is a memory for storing the contract authentication information. For example, the contract authentication information in the contract authentication information storage unit 260 is switched based on control by the contract authentication information switch control unit 250 (control to switch the contract authentication information).

For example, a case is assumed where the contract authentication information storage unit 260 includes an USIM card mounting unit capable of mounting a plurality of USIM cards. In this case, the contract authentication information switch control unit 250 performs the control to invalidate the USIM card which is currently valid and to validate the other USIM cards from among the plurality of USIM cards mounted in the USIM card mounting unit. As a result, the contract authentication information can be switched.

In this way, the wireless communication apparatus 200 which can dynamically select the best wireless communication network (network operator) from among the plurality of wireless communication networks can be provided by providing the USIM card mounting unit capable mounting the plurality of USIM cards.

Also, for example, a case is assumed where the contract authentication information storage unit 260 includes a dedicated memory in which the plurality of pieces of the contract authentication information is stored via software. In this case, the contract authentication information switch control unit 250 performs the control to invalidate the contract authentication information which is currently valid and to validate the other one from among the plurality of pieces of the contract authentication information stored in the memory. As a result, the contract authentication information can be switched. Here, it is assumed that a method for switching via software be an expression including data overwriting and the like. For example, a memory which can perform validation and invalidation processing of the contract authentication information can be used rather than a dedicated memory in which the contract authentication information is fixedly written. Also, as the contract authentication information to be switched, the contract authentication information downloaded from the other information processor (for example, a server operated by the network operator regarding the contract authentication information) via the wireless communication unit 220 may be used.

The validation and invalidation processing of the USIM can be performed by using the validation and invalidation processing specified by the third generation partnership project (3GPP). Each processing is performed, for example, in a sales shop of the mobile phone apparatus.

Also, the contract authentication information switch control unit 250 performs switching control of the contract authentication information stored in the contract authentication information storage unit 260 and control for switching the carrier frequency or the wireless communication system of the wireless communication unit 220 according to the switching of the contract authentication information. That is, the contract authentication information switch control unit 250 can automatically switch the carrier frequency or the wireless communication system to those corresponding to the contract authentication information after the switching. In this way, the contract authentication information switch control unit 250 can perform control to change at least one setting of the carrier frequency or the wireless communication system of the wireless communication unit 220 according to the switching of the contract authentication information. For example, a case is considered that network operators A and B provide a communication service by a high speed packet access (HSPA) and a long term evolution (LTE). Here, when the HSPA service of the network operator A is switched to that of the network operator B, it is necessary to switch the carrier frequency of the network operator A to that of the network operator B in accordance with the switching of the contract authentication information. Also, when the HSPA service of the network operator A is switched to the LTE service of the network operator B, it is necessary to switch the carrier frequency and the transmission system in accordance with the switching of the contract authentication information. That is, when the HSPA service of the network operator A is switched to the LTE service of the network operator B, the carrier frequency of the network operator A is switched to that of the network operator B in accordance with the switching of the contract authentication information. Also, the transmission system is switched from the HSPA to the LTE in accordance with the switching of the contract authentication information. The change of the transmission system widely includes a change of an occupied bandwidth, a change of a duplex system of a frequency division duplex (FDD) and a time division duplex (TDD), and the like. Also, the change of the transmission system widely includes a change of a proportion between an uplink and a downlink per frame and the like in a case of the TDD. Also, the transmission system is not limited to the HSPA and the LTE and can be applied to other than these. For example, the transmission system includes a Global System for Mobile communications (GSM) (registered trademark), a code division multiple access (CDMA) 2000, and the like. Also, the transmission system includes a wideband code division multiple access (W-CDMA), a universal mobile telecommunications system (UMTS), and the like. Also, the transmission system includes a high speed downlink packet access (HSDPA), a high speed packet access plus (HSPA+), a LTE-advanced, and the like.

Here, the respective processing by the communication quality detection unit 230, the communication quality determination unit 240, and the contract authentication information switch control unit 250 may be performed only when the wireless communication apparatus 200 is in an idle state. For example, unlike the received signal strength RSSI, the degree of the congestion dynamically changes. Therefore, in a case where the degree of the congestion is used as the communication quality, the communication quality dynamically changes even when the wireless communication apparatus 200 stays at the same point. Therefore, even when the wireless communication apparatus 200 stays at the same point, the contract authentication information is switched every time when it is determined that the communication quality do not satisfy the desired quality. Accordingly, the wireless communication apparatus 200 can wait in a state that the user can constantly use the optimal wireless communication service (network operator).

The display control unit 270 associates the information about the communication quality (communication quality information) detected by the communication quality detection unit 230 with the information about the network operator (network operator information) switched by the contract authentication information switch control unit 250 and displays it on the display unit 280. Here, the communication quality information may include not only the value regarding the communication quality but also the name of the network operator, the name of the communication system, and the like corresponding to the communication quality.

The display unit 280 displays various information based on the control of the display control unit 270. For example, a display panel such as an organic electro luminescence (EL) panel and a liquid crystal display (LCD) panel can be used as the display unit 280. Also, the operation reception unit 210 and the display unit 280 can be integrated by using the touch panel as mentioned above.

In this way, the user can easily grasp the communication qualities of the plurality of wireless communication networks by displaying the communication quality information and the network operator information on the display unit 280. At the same time, the user can easily grasp the communication quality of the wireless communication network which is currently selected.

[Display Example of Communication Quality Information and Network Operator Information]

FIGS. 3a to 4b are diagrams of exemplary display screens displayed on the display unit 280 according to the first embodiment of the present technique.

FIGS. 3a and 3b are display examples of a case where the switching operation of the network operator is performed based on operation by the user. A display screen 300 is shown in FIG. 3a and displays a value (evaluation value) (one to five), in which the communication quality about each network operator has been evaluated on a scale of one to five, on the lower side of network operator buttons 301 and 302. Also, a display screen 305 is shown in FIG. 3b and displays a value of an effective communication speed as the communication quality about each network operator on the lower side of the network operator buttons 301 and 302.

The communication quality detected by the communication quality detection unit 230 is displayed as the communication quality about each network operator.

The network operator buttons 301 and 302 is buttons to select a network operator which is desired by the user to be switched. Also, one of the network operator buttons 301 and 302 which is for the network operator currently set may have a visual difference compared with another button. In FIGS. 3a and 3b, an example is shown in which an outline of the network operator button of the network operator which is currently set is indicated by a thick line. At the same time, in the example, the display size of the communication quality information displayed on the lower side of the network operator button is increased, and visual difference is provided.

In FIGS. 4a and 4b, an example of display transition at the time of the switching of the network operator (contract authentication information) is shown. A display example before the switching of the network operator (contract authentication information) (display screen 300) is shown in FIG. 4a, and a display example immediately after the switching of the network operator (contract authentication information) (display screen 310) is shown in FIG. 4b.

For example, the user presses the network operator button 302 on the display screen 300 shown in FIG. 4a so that the switching operation to switch the contract authentication information regarding the second network operator is received by the operation reception unit 210. Here, when the display unit 280 is not the touch panel, the switching operation may be received by an input of a specific key.

Also, for example, as shown in FIG. 4a, when the communication quality provided by the first network operator which is currently set is lower than the threshold (for example, three), the communication quality determination unit 240 outputs the determination result to the contract authentication information switch control unit 250. The determination result indicates that the communication quality provided by the first network operator which is currently set is lower than the threshold. In this case, the contract authentication information switch control unit 250 performs the control to switch the contract authentication information from that regarding the first network operator to that regarding the second network operator.

In this way, the contract authentication information is switched by manual switching based on the operation by the user or automatic switching based on the detected communication quality. After the switching processing has been performed, the display screen 310 shown in FIG. 4b is displayed.

As shown in FIG. 4b, a network operator regarding a newly set contract authentication information can have a display aspect (for example, color or visual effect) different from that of other network operator by the switching processing of the contract authentication information. For example, an outline of the network operator button 302 of the network operator which is newly set is indicated by a thick line, and at the same time, the display size of the communication quality information displayed on the lower side of the network operator button 302 is increased, and then, the visual difference is provided. In addition, the network operator which is newly set can be easily grasped by displaying an indicator such as an arrow 311. A notice by letters such as "network operator has been switched" may be displayed at the time of the switching of the contract authentication information or within a certain period of time (for example, about one to five minutes) after the switching has been performed. Also, a notice by an audio output, a notice by vibration, and the like may be provided at any time.

In this way, in the first embodiment of the present technique, since the communication qualities regarding the plurality of wireless communication networks can be displayed, the user can easily grasp the best wireless communication network (network operator). Also, since the contract authentication information can be manually switched, the user can easily switch the contract authentication information to the desired contract authentication information.

In FIGS. 3a to 4b, examples having two pieces of the contract authentication information to be switched are shown. However, the number of pieces of the contract authentication information to be switched is not limited to two and may be equal to or more than three. Also, in FIGS. 3a to 4b, examples for displaying two network operators are shown. However, when the number of pieces of the contract authentication information to be switched is equal to or more than three, all the contract authentication information to be switched may be displayed. Also, a part of the network operators (for example, the upper network operator having higher communication quality) may be displayed, and the other network operator may be displayed based on the operation by the user (for example, scroll operation).

Also, in FIGS. 3a to 4b, examples for displaying the name of the network operator as the information about the network operator are displayed. However, the other information may be displayed. For example, the abbreviation name of the network operator, a logo, the name of the communication system, and the abbreviation name of the communication service can be displayed as the information about the network operator. Also, all of them or a part of them may be combined and displayed.

Also, in FIGS. 3a to 4b, examples for displaying the value in which the communication quality is evaluated on the scale of one to five (evaluation value) or the value of the effective communication speed as the information about the communication quality are shown. However, the other information may be displayed. For example, a meter display, an icon display, and the like may be provided with respect to the value in which the communication quality is evaluated on the scale of one to five (evaluation value) or the value of the effective communication speed. Also, these may be expressed by a color difference.

[Operation Example of Wireless Communication Apparatus]

Figure 5:
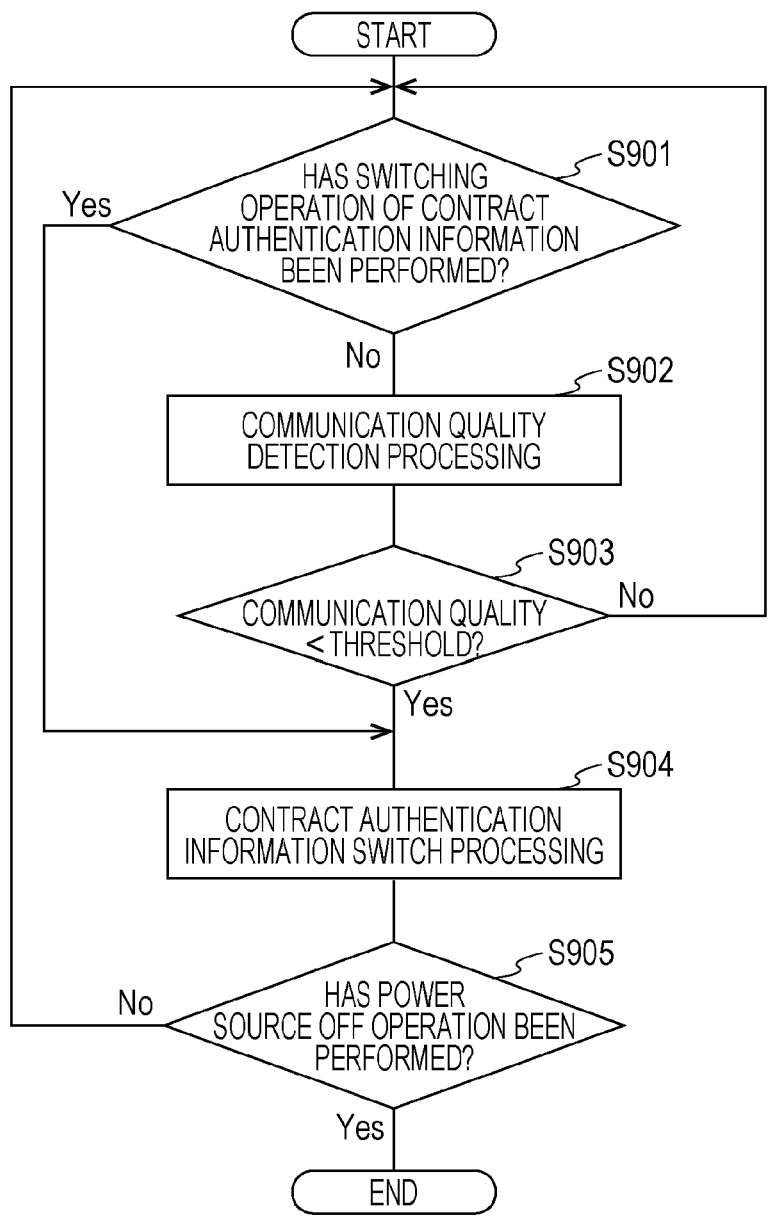
FIG. 5 is a flowchart of an exemplary procedure of contract authentication information switch processing by the wireless communication apparatus 200 according to the first embodiment of the present technique.

FIG. 5 is a flowchart of an exemplary procedure of the contract authentication information switch processing by the wireless communication apparatus 200 according to the first embodiment of the present technique.

When a power source of the wireless communication apparatus 200 is turned on, the contract authentication information switch control unit 250 determines whether the switching operation of the contract authentication information has been received by the operation reception unit 210 (step S901). When the switching operation has been received, the flow proceeds to step S904. On the other hand, when the switching operation has not been received (step S901), the communication quality detection unit 230 detects the communication quality (step S902). Step S902 is an exemplary acquisition procedure described in claims.

Subsequently, the communication quality determination unit 240 determines whether the communication quality detected by the communication quality detection unit 230 is lower than the threshold (step S903). When the communication quality is not lower than the threshold, the flow returns to step S901. On the other hand, when the communication quality is lower than the threshold (step S903), the contract authentication information switch control unit 250 performs the control to switch the contract authentication information stored in the contract authentication information storage unit 260 (step S904). That is, the contract authentication information switch processing from the contract authentication information regarding the network operator having the communication quality lower than the threshold to the other contract authentication information is performed. Here, for example, when the five-scale evaluation value is used as the communication quality, it can be assumed that the threshold be "three". Steps S903 and S904 are exemplary control procedures described in claims.

Subsequently, it is determined whether power source off operation for turning off the power source of the wireless communication apparatus 200 has been performed (step S905). When the power source off operation has been performed, the operation of the contract authentication information switch processing is terminated, and when the power source off operation has not been performed, the flow returns to step S901.

In this way, the contract authentication information switch control unit 250 switches the contract authentication information based on the communication quality obtained by the communication quality detection unit 230. However, when the switching operation of the contract authentication information has been received, the contract authentication information switch control unit 250 switches the contract authentication information according to the switching operation regardless of the communication quality.

[Operation Example when the Wireless Communication Apparatus Exits Out of the Communication Range]

Here, it is assumed that a communication state of the wireless communication apparatus 200 become out of the communication range. In this case, the contract authentication information may be switched to the other one regardless of the degree of the communication quality. However, for example, it is also assumed that there be a place where the communication state of the wireless communication apparatus 200 becomes out of the communication rage regarding all the plurality of network operators. When the wireless communication apparatus 200 exists in the place like this, it is assumed that the switching of the contract authentication information be frequently performed. However, even if the switching of the contract authentication information is frequently performed during a period when the wireless communication apparatus 200 exists in the place like this, it is possible that the wireless communication apparatus 200 still stays out of the communication range and an infinite loop of the switching of the contract authentication information occurs.

An example is shown below in which the contract authentication information is switched to the other contract authentication information regardless of the degree of the communication quality when the communication state of the wireless communication apparatus 200 is out of the communication range. However, when a state that the wireless communication apparatus is out of the communication range continues for a predetermined period of time, the monitoring as to whether the wireless communication apparatus 200 stays out of the communication range continues until the communication service recovers in order to avoid the infinite loop of the switching of the contract authentication information.

Figure 6:
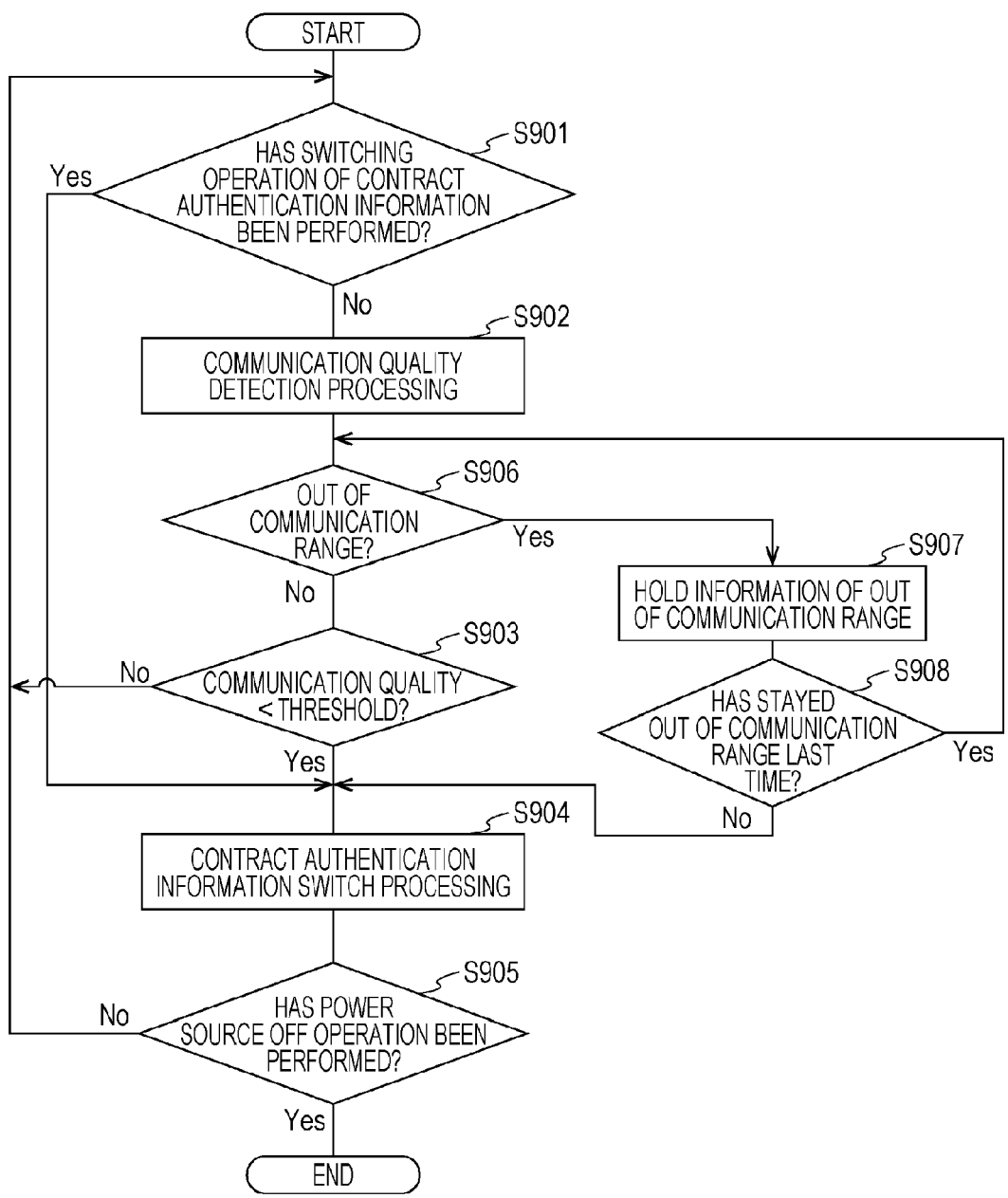
FIG. 6 is a flowchart of an exemplary procedure of the contract authentication information switch processing by the wireless communication apparatus 200 according to the first embodiment of the present technique.

FIG. 6 is a flowchart of an exemplary procedure of the contract authentication information switch processing by the wireless communication apparatus 200 according to the first embodiment of the present technique. Since FIG. 5 is a modification of FIG. 6, common parts are denoted with the same reference numerals as those of FIG. 5 and a part of the description regarding the common parts is omitted.

The contract authentication information switch control unit 250 determines whether the communication state of the wireless communication apparatus 200 is out of the communication range based on the information from the wireless communication unit 220 (step S906). When the wireless communication apparatus 200 is not out of the communication range (step S906), the flow proceeds to step S903.

Also, when the wireless communication apparatus 200 is out of the communication range (step S906), the contract authentication information switch control unit 250 holds information that the communication service of the current network operator is out of the communication range (information of out of the communication range) (step S907). Subsequently, the contract authentication information switch control unit 250 determines whether the communication state of the wireless communication apparatus 200 has been out of the communication range based on the held information of out of the communication range last time (step S908).

When the wireless communication apparatus 200 has not been out of the communication range last time (step S908), the flow proceeds to step S904. On the other hand, when the wireless communication apparatus 200 has been out of the communication range last time (step S908), the flow returns to step S906 in order to avoid the infinite loop of the switching of the contract authentication information. Accordingly, the monitoring as to whether the wireless communication apparatus 200 is out of the communication range continues until the communication service recovers.

In this way, the contract authentication information switch control unit 250 switches the contract authentication information regardless of the communication quality detected by the communication quality detection unit 230 when the position where the wireless communication apparatus 200 exists is out of the communication range. However, when the state that the wireless communication apparatus is out of the communication range continues for a predetermined period of time, the contract authentication information switch control unit 250 does not switch the contract authentication information until the state of out of the communication range is cleared.

In FIG. 6, the example has been shown in which it is determined whether the wireless communication apparatus 200 is out of the communication range after the detection processing of the communication quality. However, it may be determined whether the wireless communication apparatus 200 is out of the communication range before or at the time of the detection procedure of the communication quality.

Also, in FIG. 6, the example has been shown in which the monitoring as to whether the wireless communication apparatus 200 is out of the communication range continues until the communication service recovers when the wireless communication apparatus 200 continues to stay out of the communication range. However, the detection procedure of the communication quality and the monitoring as to whether the wireless communication apparatus 200 is out of the communication range may stop until a predetermined time (for example, ten minutes) elapses when the wireless communication apparatus 200 continues to stay out of the communication range.

According to the operation by the user, the position information (for example, information indicating the position is in an urban area or mountainous area), and the like, the setting may be changed so as to switch the contract authentication information even when the wireless communication apparatus 200 continues to stay out of the communication range.

[Example in which the Contract Authentication Information is Obtained from Outside]

Figure 7:
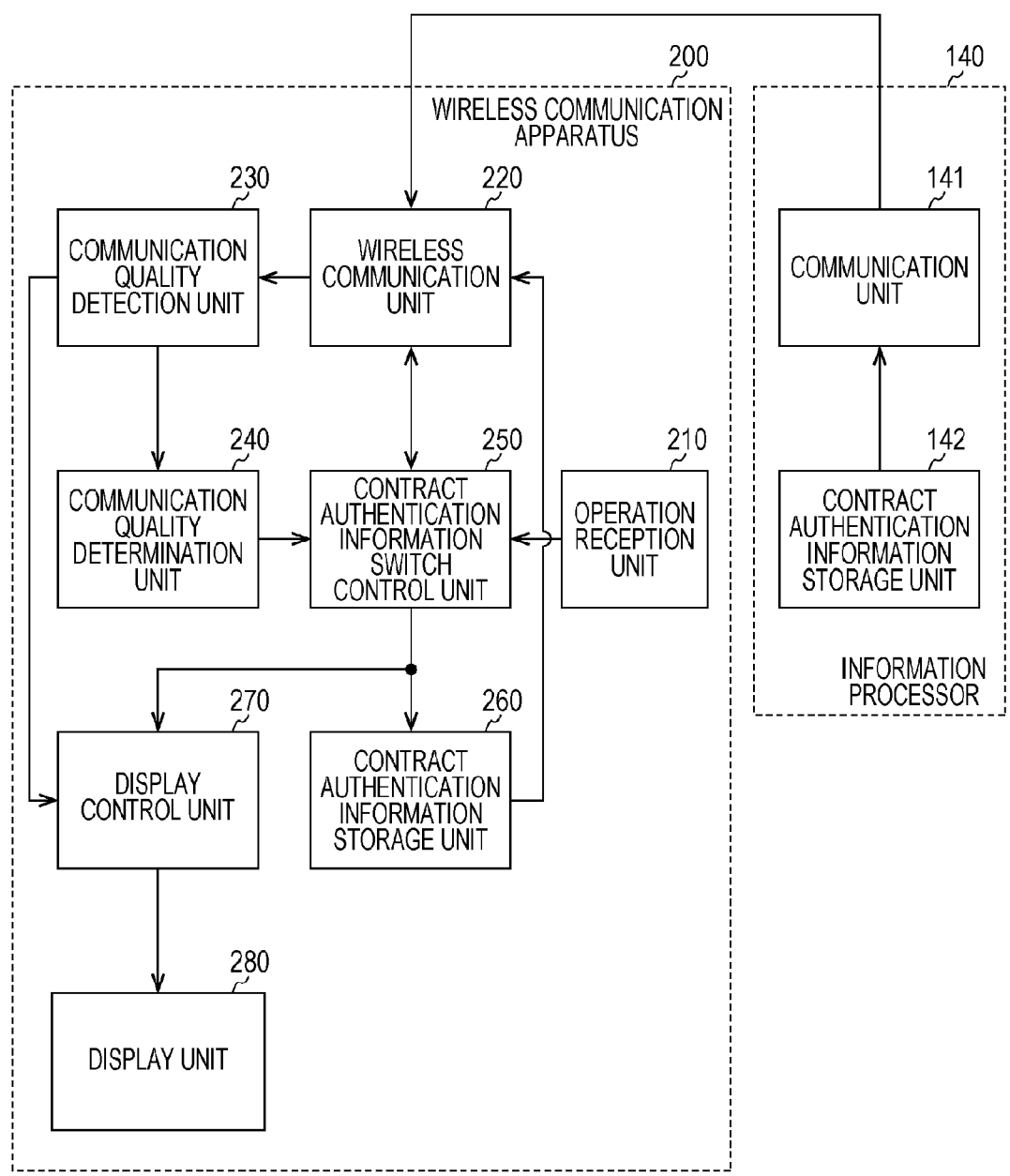
FIG. 7 is a block diagram of an exemplary function structure of the wireless communication apparatus 200 and an information processor 140 according to the first embodiment of the present technique.

FIG. 7 is a block diagram of an exemplary function structure of the wireless communication apparatus 200 and the information processor 140 according to the first embodiment of the present technique. The wireless communication apparatus 200 is similar to that of FIG. 2.

The information processor 140 includes a communication unit 141 and a contract authentication information storage unit 142.

The communication unit 141 transmits/receives various information to/from the wireless communication apparatus 200 via the base station operated by the network operator (for example, the first and second network operators shown in FIG. 1).

The contract authentication information storage unit 142 stores the contract authentication information regarding one or a plurality of network operators to provide it to the wireless communication apparatus 200.

For example, in order to switch the contract authentication information, the contract authentication information switch control unit 250 performs the control to transmit the transmission request of the contract authentication information to the information processor 140 by using the wireless communication. Also, when the communication unit 141 has received the transmission request from the wireless communication apparatus 200, the communication unit 141 of the information processor 140 obtains the contract authentication information corresponding to the transmission request from the contract authentication information storage unit 142. The communication unit 141 of the information processor 140 transmits the obtained contract authentication information to the wireless communication apparatus 200.

When the wireless communication apparatus 200 has received the contract authentication information from the information processor 140, the contract authentication information switch control unit 250 obtains the contract authentication information via the wireless communication unit 220 and makes the contract authentication information storage unit 260 store the contract authentication information.

In this way, the contract authentication information which is necessary to connect to the base station can be obtained from an external apparatus (information processor 140), and the wireless communication apparatus 200 which can rewrite the contract authentication information via a software can be provided.

In this way, in the first embodiment of the present technique, the contract authentication information can be automatically switched by dynamically selecting the best wireless communication network (network operator) based on the communication quality at the position where the wireless communication apparatus exists. Also, the optimal wireless communication network (network operator) can be easily selected at the time of the connection by monitoring the communication quality of one or the plurality of wireless communication networks in idle mode. Also, the best wireless communication network (network operator) can be dynamically and automatically selected between the wireless communication networks having different carrier frequencies and transmission systems from each other.

2. Second Embodiment

In the first embodiment of the present technique, an example has been shown in which the contract authentication information (connection right) is switched based on the comparison result between the communication quality and the threshold. However, it is also assumed that the communication quality before the switching of the contract authentication information (connection right) is better than that after the switching of the contract authentication information (connection right). In this case, it is preferable to restore it to the original contract authentication information (connection right).

In the second embodiment of the present technique, an example is shown in which the contract authentication information (connection right) is switched based on the comparison result between before and after the switching of the contract authentication information (connection right). The wireless communication apparatus in the second embodiment of the present technique is a partially modified wireless communication apparatus 200 shown in FIG. 2 and the like. Therefore, the common parts are denoted with the same reference numerals as those of the wireless communication apparatus 200, and a part of the description regarding the common parts is omitted.

[Configuration Example of Wireless Communication Apparatus]

Figure 8:
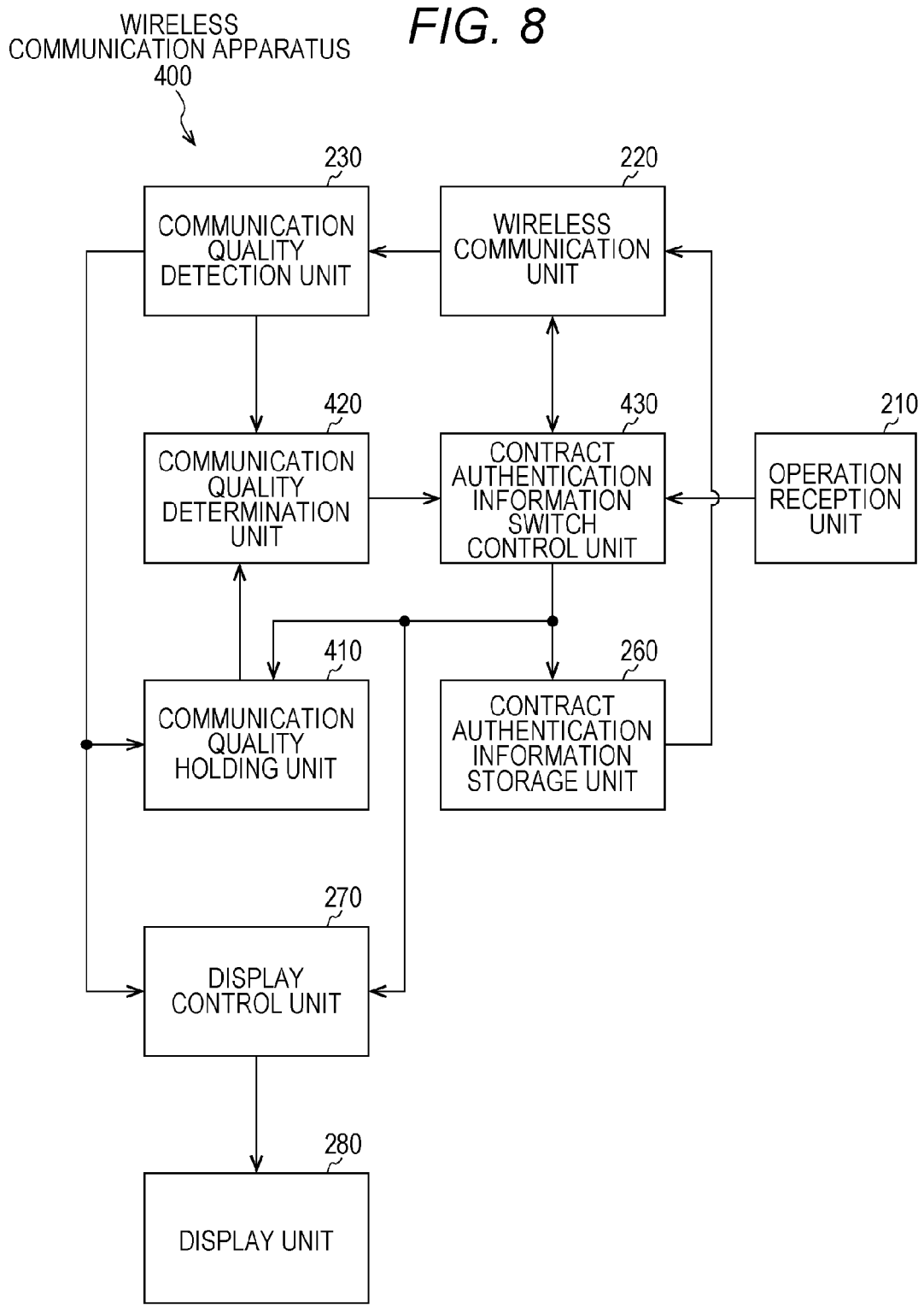
FIG. 8 is a block diagram of an exemplary function structure of a wireless communication apparatus 400 according to a second embodiment of the present technique.

FIG. 8 is a block diagram of an exemplary function structure of a wireless communication apparatus 400 according to the second embodiment of the present technique.

The wireless communication apparatus 400 includes a communication quality holding unit 410, a communication quality determination unit 420, and a contract authentication information switch control unit 430.

The communication quality holding unit 410 holds information about the communication quality (communication quality information) obtained at the time of or immediately before switching of contract authentication information according to a control signal of a contract authentication information switching instruction from the contract authentication information switch control unit 430. Also, the communication quality holding unit 410 supplies the held communication quality information to the communication quality determination unit 420. The communication quality holding unit 410 may hold the communication quality of an arbitrary period of time so that the communication quality determination unit 420 can use an average value of the arbitrary period of time (for example, about ten minutes). Also, the communication quality holding unit 410 is an exemplary hold unit described in claims.

The communication quality determination unit 420 determines the communication quality by comparing a communication quality detected by a communication quality detection unit 230 with a communication quality stored in the communication quality holding unit 410. The communication quality determination unit 420 outputs the determination result to the contract authentication information switch control unit 430. Here, a value may be used in which the respective communication qualities to be compared are averaged by the arbitrary period of time (for example, about ten minutes).

The contract authentication information switch control unit 430 performs the control to switch the contract authentication information stored in a contract authentication information storage unit 260 based on the determination result by a communication quality determination unit 240. Also, the contract authentication information switch control unit 430 outputs the control signal of the contract authentication information switching instruction to the communication quality holding unit 410 when the contract authentication information is switched. Here, for example, a case is assumed where the determination result has been output from the communication quality determination unit 420. The determination result indicates that the communication quality after the switching of the contract authentication information is deteriorated than that before the switching of the contract authentication information. In this case, the contract authentication information switch control unit 430 performs the control to return a setting of the contract authentication information to that before the switching.

In this way, the contract authentication information switch control unit 430 makes the communication quality holding unit 410 hold the communication quality obtained at the time of or immediately before the switching of the contract authentication information. The contract authentication information switch control unit 430 determines after the switching whether the switching of the contract authentication information is performed based on the comparison result between the communication quality obtained after the switching and the communication quality held by the communication quality holding unit 410.

[Display Example of Communication Quality Information and Network Operator Information]

Figure 9:
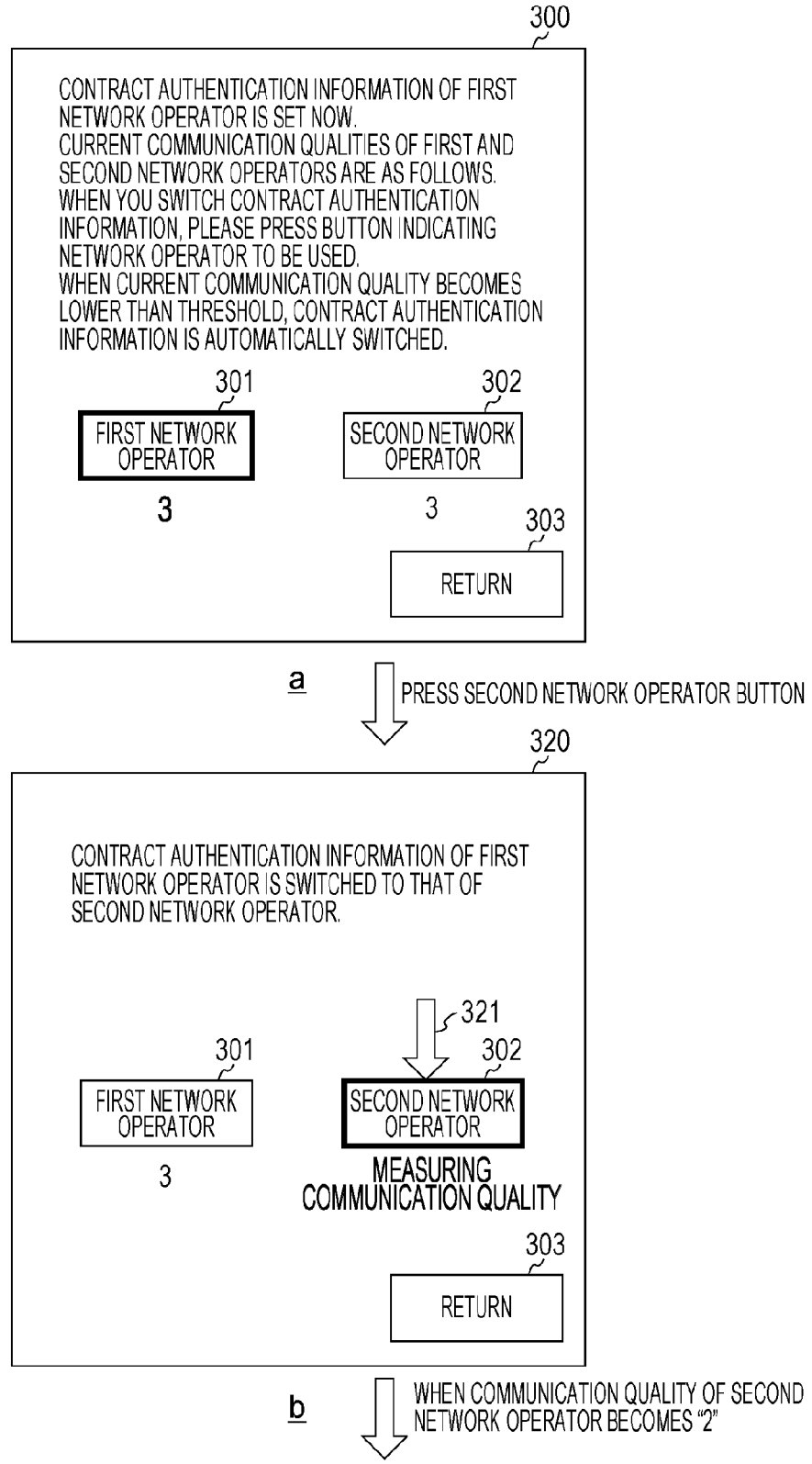
FIGS. 9a and 9b are diagrams of exemplary display screens displayed on a display unit 280 according to the second embodiment of the present technique.
Figure 10:
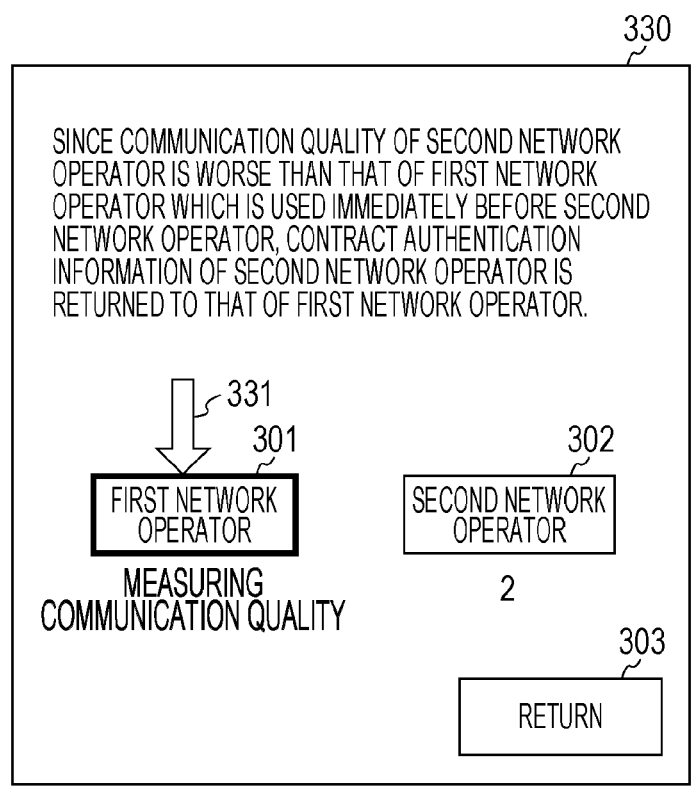
FIG. 10 is a diagram of an exemplary display screen displayed on the display unit 280 according to the second embodiment of the present technique.

FIGS. 9a to 10 are diagrams of exemplary display screens displayed on a display unit 280 according to the second embodiment of the present technique.

A display screen 300 is shown in FIG. 9a and displays an evaluation value (one to five) of the communication quality about each network operator on the lower side of network operator buttons 301 and 302. The display screen 300 is similar to that in FIGS. 3a and 3b except for the evaluation value.

Here, in the example in FIG. 9a, it is assumed that a network operator which is currently set be a "first network operator" and the evaluation value of the communication quality of the first network operator be "three" on the scale of one to five. Also, it is assumed that another network operator be a "second network operator" and the evaluation value of the communication quality of the second network operator be "three" on the scale of one to five.

Here, when a user presses the network operator button 301 on the display screen 300 in a state shown in FIG. 9a in order to switch the setting of the contract authentication information, the contract authentication information is switched. In this way, when the contract authentication information is switched, the contract authentication information switch control unit 430 makes the communication quality holding unit 410 hold the information about the communication quality (communication quality information) of the first network operator at the time of the switching operation. Also, as shown in FIG. 9b, the information about the communication quality (communication quality information) of the first network operator at the time of the switching operation is continuously displayed on a display screen 320 after the switching operation.

Also, measurement of the communication quality of the second network operator after the switching newly starts. Therefore, the content (for example, "measuring the communication quality") is displayed on the display screen 320.

Here, a case is assumed where the detection processing regarding the communication quality of the second network operator after the switching has been terminated and the evaluation value of the communication quality obtained by the detection is lower than the communication quality of the first network operator at the time of the switching operation (for example, "two" on the scale of one to five). In this case, it can be determined that the communication quality is deteriorated by the switching of the new contract authentication information according to the comparison between the communication quality "three" of the first network operator at the time of the switching operation and the communication quality "two" of the second network operator after the switching. That is, the communication quality determination unit 420 compares the communication quality "three" of the first network operator at the time of the switching operation with the communication quality "two" of the second network operator after the switching. The communication quality determination unit 420 determines that the communication quality is deteriorated by the switching of the new contract authentication information and outputs the determination result to the contract authentication information switch control unit 430. When the determination result has been received, the contract authentication information switch control unit 430 performs the switching control of the contract authentication information in order to return the setting of the contract authentication information to that before the switching. That is, the switching processing of the contract authentication information from the second network operator to the first network operator is performed. Accordingly, a display screen 330 shown in FIG. 10 is displayed.

Here, similarly, in a case where the switching processing of the contract authentication information from the second network operator to the first network operator has been performed, the communication quality holding unit 410 holds the information about the communication quality of the second network operator at the time of switching the contract authentication information. Also, the communication quality "two" is displayed on the display screen 330. Similarly, each following processing is continuously performed.

[Operation Example of Wireless Communication Apparatus]

Figure 11:
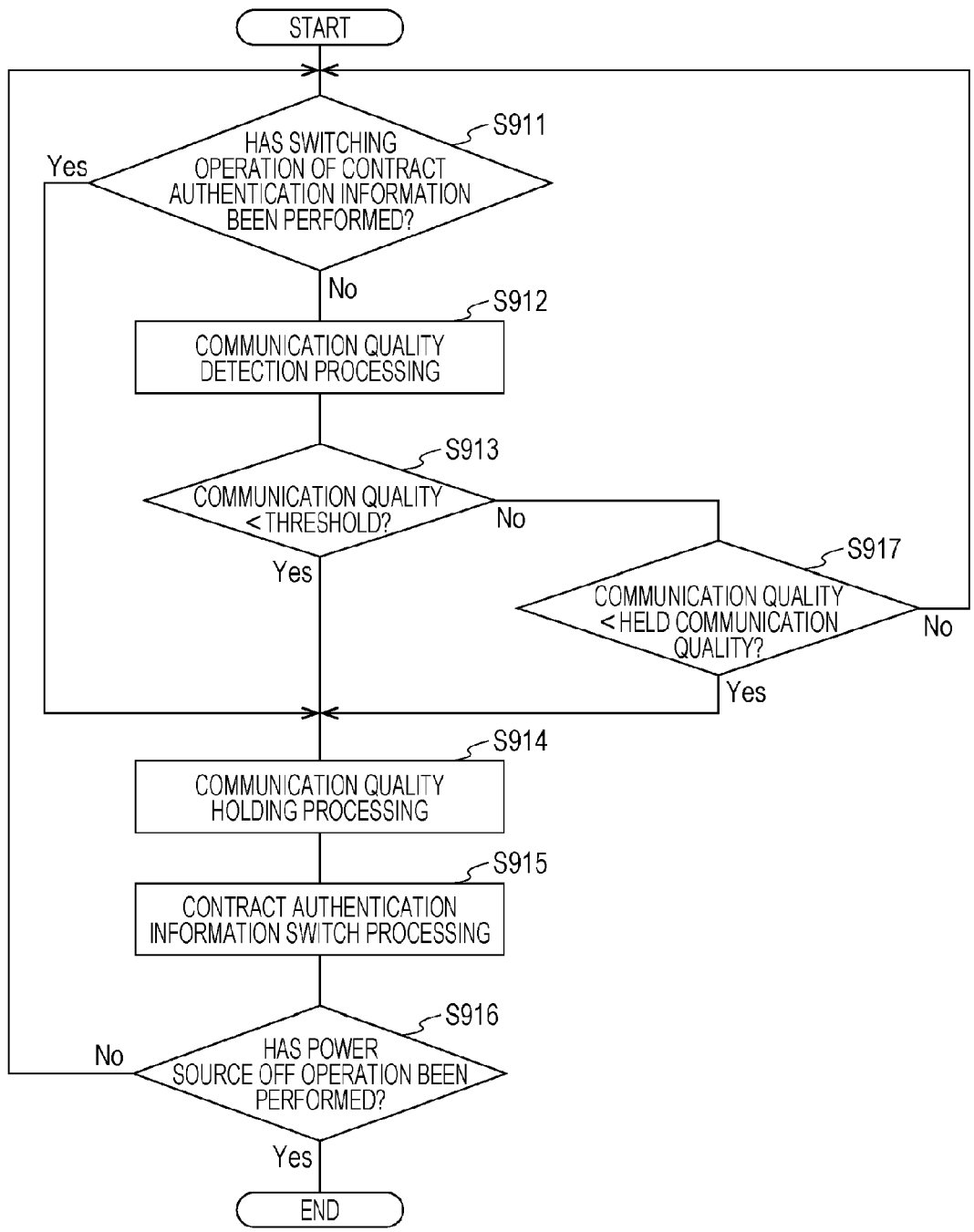
FIG. 11 is a flowchart of an exemplary procedure of contract authentication information switch processing by the wireless communication apparatus 400 according to the second embodiment of the present technique.

FIG. 11 is a flowchart of an exemplary procedure of the contract authentication information switch processing by the wireless communication apparatus 400 according to the second embodiment of the present technique.

When a power source of the wireless communication apparatus 400 is turned on, the contract authentication information switch control unit 430 determines whether the switching operation of the contract authentication information has been received by the operation reception unit 210 (step S911). When the switching operation has been received, the flow proceeds to step S914. On the other hand, when the switching operation has not been received (step S911), the communication quality detection unit 230 detects the communication quality (step S912).

Subsequently, the communication quality determination unit 420 determines whether the communication quality detected by the communication quality detection unit 230 is lower than the threshold (step S913). When the communication quality is lower than the threshold (step S913), the contract authentication information switch control unit 430 makes the communication quality holding unit 410 hold the communication quality detected by the communication quality detection unit 230 (step S914).

Subsequently, the contract authentication information switch control unit 430 performs the control to switch the contract authentication information stored in the contract authentication information storage unit 260 (step S915). That is, the contract authentication information switch processing from the contract authentication information regarding the network operator having the communication quality lower than the threshold to the other contract authentication information is performed. Subsequently, it is determined whether the power source off operation for turning off the power source of the wireless communication apparatus 400 has been performed (step S916). When the power source off operation has been performed, the operation of the contract authentication information switch processing is terminated, and when the power source off operation has not been performed, the flow returns to step S911.

Also, when the communication quality is not lower than the threshold (step S913), the communication quality determination unit 420 determines whether the communication quality detected by the communication quality detection unit 230 is worse than the communication quality held by the communication quality holding unit 410 (step S917). When the communication quality detected by the communication quality detection unit 230 is not worse than the communication quality held by the communication quality holding unit 410 (that is, equal to or better than the communication quality held by the communication quality holding unit 410) (step S917), the flow returns to step S911.

Also, when the detected communication quality is worse than the held communication quality (step S917), the contract authentication information switch control unit 430 makes the communication quality holding unit 410 hold the communication quality detected by the communication quality detection unit 230 (step S914).

In this way, when the communication quality of the newly switched wireless communication network is lower than the communication quality before the switching, the wireless communication network can be automatically switched to the original wireless communication network. Accordingly, the best wireless communication network (network operator) can be constantly set.

[Selection Example of Equal to or More than Three Contract Authentication Information]

The example has been shown above in which two pieces of the contract authentication information are switched. However, the embodiments of the present technique can be applied to a case where equal to or more than three pieces of the contract authentication information are switched. An example will be shown below in which equal to or more than three pieces of the contract authentication information are switched.

Figure 12:
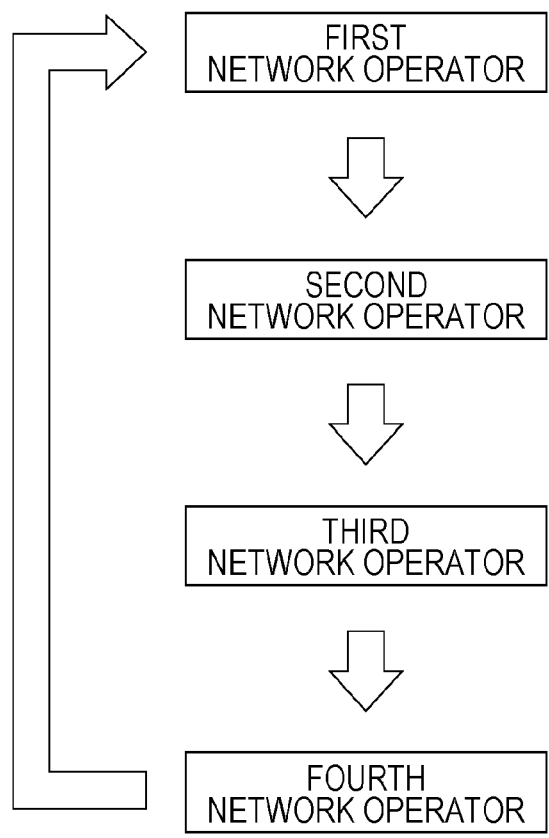
FIG. 12 is a schematic diagram of an example of selection of a network operator by a contract authentication information switch control unit 430 according to the second embodiment of the present technique.

FIG. 12 is a schematic diagram of an example of selection of a network operator by a contract authentication information switch control unit 430 according to the second embodiment of the present technique. In FIG. 12, an example is shown in which the contract authentication information regarding four network operators (first to fourth network operators) is switched.

As shown in FIG. 12, when the contract authentication information regarding the four network operators is switched, the contract authentication information can be switched in an order determined based on a predetermined rule. For example, the second network operator is selected next to the first network operator, and a third network operator is selected next to the second network operator. Similarly, a fourth network operator is selected next to the third network operator, and the first network operator is selected next to the fourth network operator. In this way, the contract authentication information can be sequentially switched to the contract authentication information regarding the selected network operator.

The order used when the contract authentication information regarding four network operators are switched may be previously set according to the operation by the user and the like and may be automatically set based on statistical data in the past. For example, an average value of the communication quality of each network operator in the past week is calculated, and the order can be automatically set based on the average value. For example, the order can be set that a network operator having the highest average value is the first and a network operator having the lowest average value is the fourth.

[Operation Example of Wireless Communication Apparatus]

Figure 13:
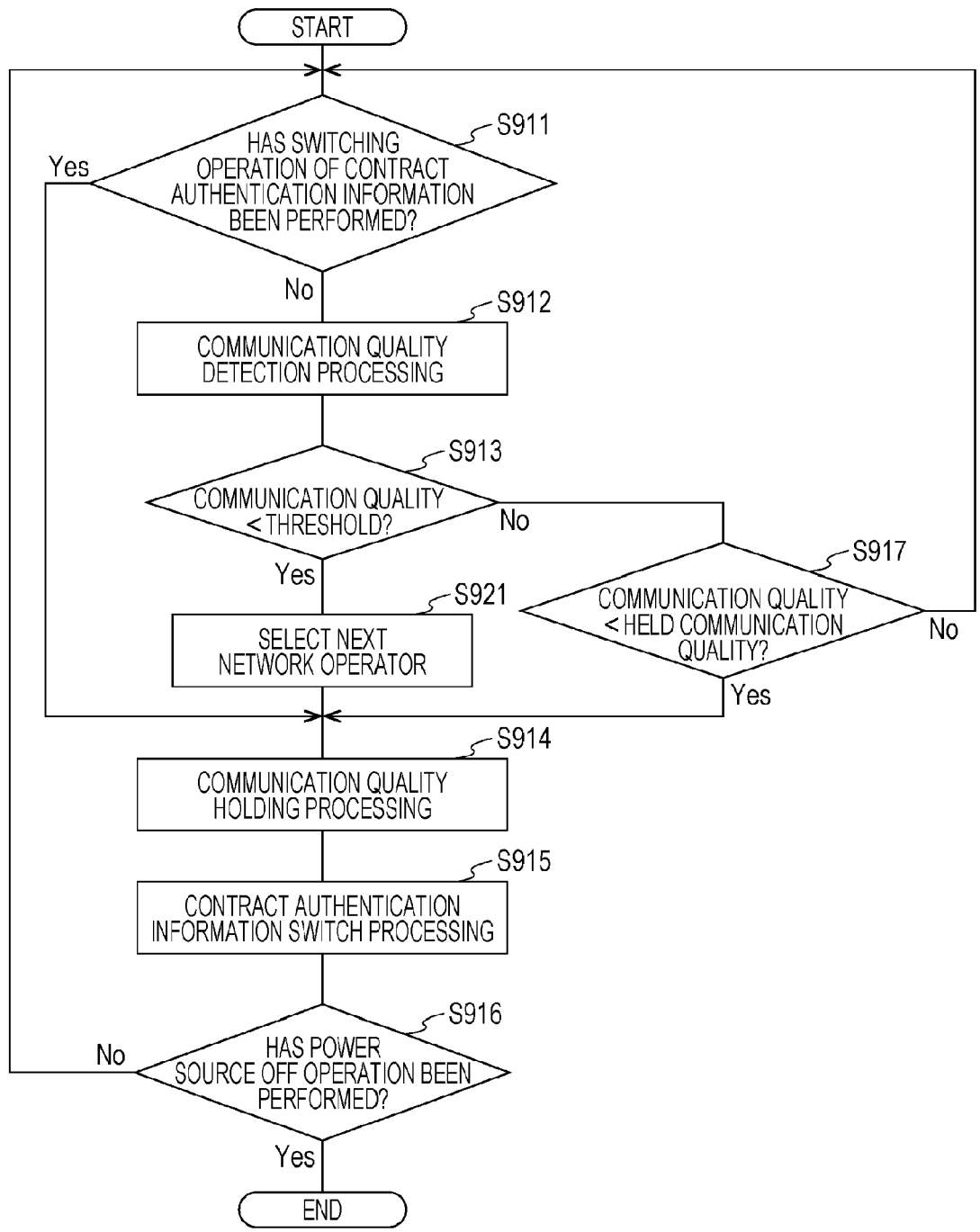
FIG. 13 is a flowchart of an exemplary procedure of the contract authentication information switch processing by the wireless communication apparatus 400 according to the second embodiment of the present technique.

FIG. 13 is a flowchart of an exemplary procedure of the contract authentication information switch processing by the wireless communication apparatus 400 according to the second embodiment of the present technique. Since FIG. 13 is a modification of FIG. 11, common parts are denoted with the same reference numerals as those of FIG. 11 and a part of the description regarding the common parts is omitted. Also, FIG. 13 is an exemplary procedure of a case where equal to or more than three pieces of the contract authentication information are switched.

When the communication quality is lower than the threshold (step S913), a next network operator is selected (step S921), and the contract authentication information switch control unit 430 makes the communication quality holding unit 410 hold the communication quality detected by the communication quality detection unit 230 (step S914).

Also, when the detected communication quality is worse than the held communication quality (step S917), the contract authentication information switch control unit 430 makes the communication quality holding unit 410 hold the communication quality detected by the communication quality detection unit 230 (step S914). In this case, the contract authentication information switch processing from the contract authentication information which is newly set to the contract authentication information regarding the network operator of which the communication quality is held by the communication quality holding unit 410 is performed. That is, when the communication quality after the switching is worse than that of the network operator immediately before the switching, the condition is restored.

3. Third Embodiment

In the first and second embodiments of the present technique, an example has been shown in which contract authentication information (connection right) is switched based on a comparison result of a communication quality and a threshold and a comparison result before and after the switching of the contract authentication information (connection right). Here, it can be considered that the communication qualities about a plurality of network operators be periodically or non-periodically measured and the contract authentication information (connection right) be switched based on the comparison result.

In the third embodiment of the present technique, an example is shown in which the contract authentication information (connection right) is switched based on the comparison result between the communication qualities regarding the plurality of network operators (an example in which the communication qualities regarding the plurality of network operators are alternately monitored). The wireless communication apparatus in the third embodiment of the present technique is a partially modified wireless communication apparatus 200 shown in FIG. 2 and the like. Therefore, the common parts are denoted with the same reference numerals as those of the wireless communication apparatus 200, and a part of the description regarding the common parts is omitted.

[Configuration Example of Wireless Communication Apparatus]

Figure 14:
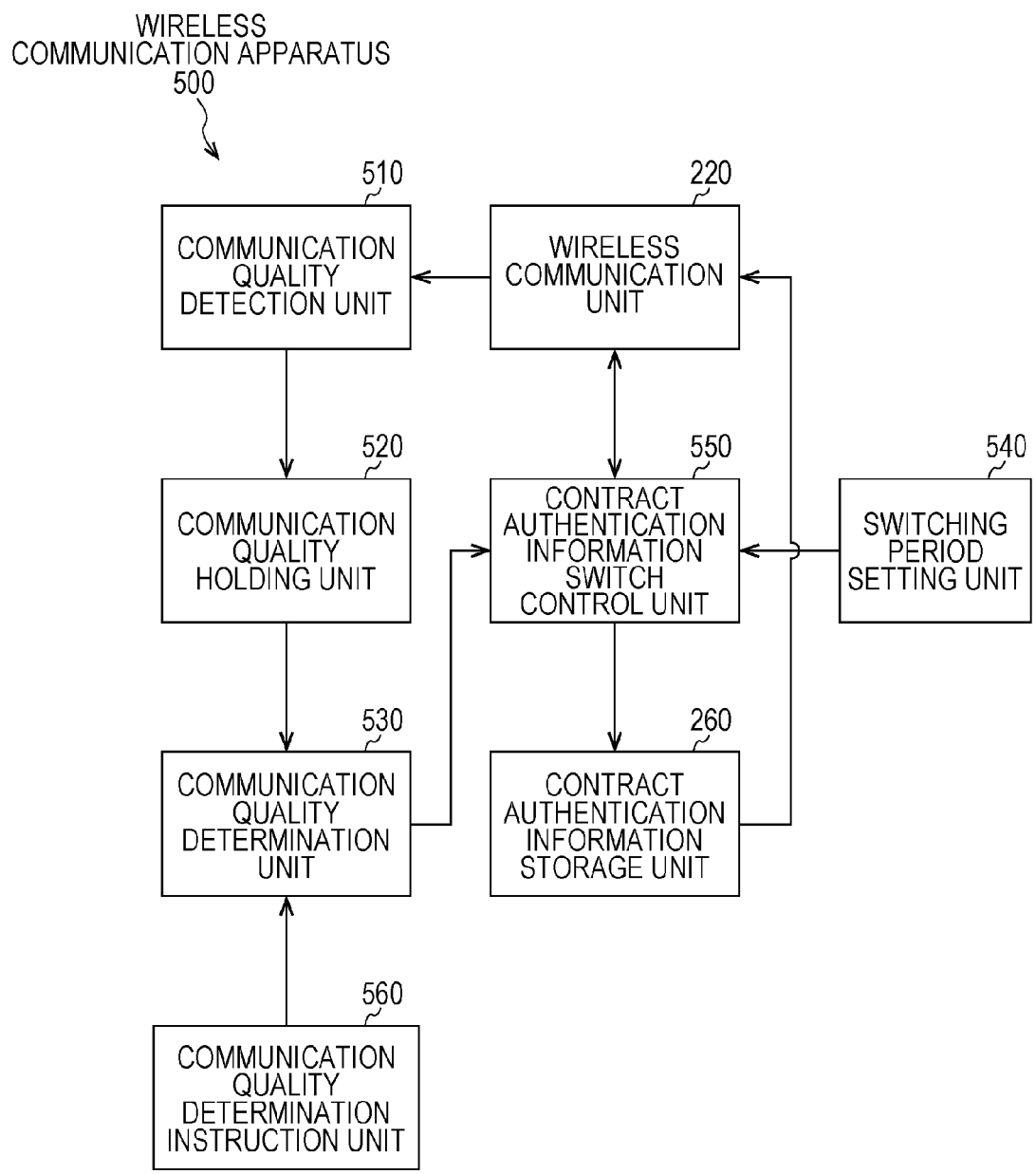
FIG. 14 is a block diagram of an exemplary function structure of a wireless communication apparatus 500 according to a third embodiment of the present technique.

FIG. 14 is a block diagram of an exemplary function structure of a wireless communication apparatus 500 according to the third embodiment of the present technique.

The wireless communication apparatus 500 includes a communication quality detection unit 510, a communication quality holding unit 520, a communication quality determination unit 530, a switching period setting unit 540, a contract authentication information switch control unit 550, and a communication quality determination instruction unit 560.

The communication quality detection unit 510 receives radio waves transmitted from a base station and detects the communication quality from the received radio waves at a fixed or variable period. The communication quality detection unit 510 makes the communication quality holding unit 520 hold the detected information about the communication quality (communication quality information) for each network operator.

The communication quality holding unit 520 holds the communication quality information detected by the communication quality detection unit 510 for each network operator and supplies the held communication quality information to the communication quality determination unit 530. The communication quality holding unit 520 may hold the communication quality of an arbitrary period of time so that the communication quality determination unit 530 can use an average value of the arbitrary period of time (for example, about ten minutes).

The communication quality determination unit 530 determines the communication quality by comparing the communication qualities of the respective network operators held by the communication quality holding unit 520 when an instruction to determine the communication quality has been output from the communication quality determination instruction unit 560. The communication quality determination unit 530 outputs the determination result to the contract authentication information switch control unit 550. For example, the communication quality determination unit 530 selects the network operator having the best communication quality from among the communication qualities held by the communication quality holding unit 520 and outputs the determination result including the selected network operator to the contract authentication information switch control unit 550.

The switching period setting unit 540 sets the period (a fixed or variable period) to switch the contract authentication information in the contract authentication information storage unit 260. The contract authentication information switch control unit 550 switches the contract authentication information in the contract authentication information storage unit 260 according to the period set by the switching period setting unit 540. Here, for example, a period of time which is necessary for measuring the communication quality (for example, about ten minutes) is set as a period set by the switching period setting unit 540.

The contract authentication information switch control unit 550 performs the control to switch the contract authentication information stored in the contract authentication information storage unit 260 according to the period set by the switching period setting unit 540. Also, the contract authentication information switch control unit 550 performs the control to switch the contract authentication information stored in the contract authentication information storage unit 260 based on the determination result by the communication quality determination unit 530. For example, when the determination result including the network operator selected as the network operator having the best communication quality is output from the communication quality determination unit 530, the contract authentication information switch control unit 550 performs the control to switch the contract authentication information to that regarding the selected network operator. Also, the contract authentication information switch control unit 550 instructs the wireless communication unit 220 to change the setting such as the wireless communication system and the carrier frequency so as to receive a communication service based on the contract authentication information after the switching.

The communication quality determination instruction unit 560 instructs the communication quality determination unit 530 to determine the communication quality. Here, a timing when the communication quality determination instruction unit 560 instructs to determine the communication quality is, for example, a timing when the user has performed a specific input operation to find an optimal network operator at the moment, a timing when the wireless communication apparatus 200 starts the wireless communication, or the like.

Although the illustration and description are omitted in this example, the communication quality detected by the communication quality detection unit 510 may be displayed on the display unit similarly to the first and second embodiments of the present technique.

[Operation Example of Wireless Communication Apparatus]

Figure 15:
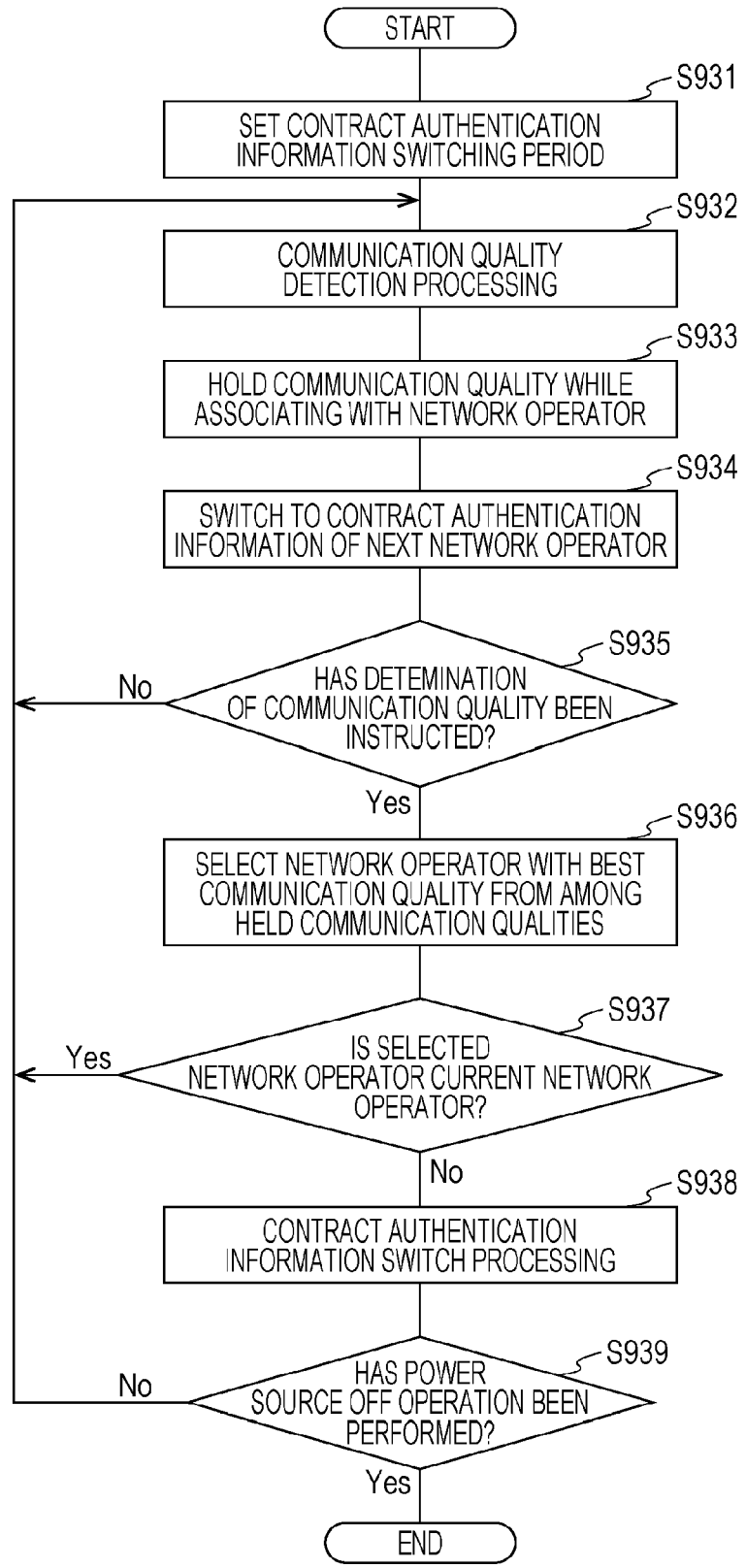
FIG. 15 is a flowchart of an exemplary procedure of the contract authentication information switch processing by the wireless communication apparatus 500 according to the third embodiment of the present technique.

FIG. 15 is a flowchart of an exemplary procedure of the contract authentication information switch processing by the wireless communication apparatus 500 according to the third embodiment of the present technique.

When the wireless communication apparatus 500 is turned on, the switching period setting unit 540 sets a period to switch the contract authentication information in the contract authentication information storage unit 260 (fixed or variable period) (step S931).

Subsequently, the communication quality detection unit 510 detects the communication quality about the network operator which is currently set (step S932). Subsequently, the communication quality detection unit 510 associates the network operator which is currently set with the detected communication quality and makes the communication quality holding unit 520 hold it (step S933). In this case, the communication quality holding unit 520 may hold only the latest communication quality and may hold the communication quality within a certain period of time in the past as history information.

Subsequently, the contract authentication information switch control unit 550 performs the control to switch the contract authentication information stored in the contract authentication information storage unit 260 based on the period set by the switching period setting unit 540 (step S934). That is, the contract authentication information switch processing from the contract authentication information regarding the network operator which is currently set to the other contract authentication information is performed according to the order determined based on the predetermined rule.

Subsequently, the communication quality determination unit 530 determines whether the determination of the communication quality is instructed (step S935). When the determination of the communication quality is not instructed, the flow returns to step S932. On the other hand, when the determination of the communication quality is instructed (step S935), the communication quality determination unit 530 selects the network operator having the best communication quality from among the communication qualities held by the communication quality holding unit 520 (step S936).

Subsequently, the contract authentication information switch control unit 550 determines whether the network operator selected by the communication quality determination unit 530 is the same as the network operator which is currently set (step S937). When the network operators are the same, the flow returns to step S932. On the other hand, when the network operators are not the same (step S937), the contract authentication information switch control unit 550 performs the control to switch the contract authentication information to that regarding the network operator selected by the communication quality determination unit 530 (step S938). That is, the contract authentication information switch processing from the contract authentication information which is currently set to that regarding the network operator selected by the communication quality determination unit 530 is performed. Subsequently, it is determined whether the power source off operation for turning off the power source of the wireless communication apparatus 500 has been performed (step S939). When the power source off operation has been performed, the operation of the contract authentication information switch processing is terminated, and when the power source off operation has not been performed, the flow returns to step S932.

In this way, the communication quality detection unit 510 sequentially obtains the communication qualities about the plurality of network operators for each network operator. The contract authentication information switch control unit 550 switches the network operator to the network operator (contract authentication information) regarding the communication quality which satisfies the predetermined condition from among the obtained communication qualities. The communication quality for satisfying the predetermined condition can be the best communication quality from among the communication qualities about the plurality of network operators.

In this way, in the third embodiment of the present technique, the communication qualities of the plurality of network operators are alternately monitored in idle mode, and the optimal network operator can be selected when the wireless communication actually starts.

4. Fourth Embodiment

In the first to third embodiments of the present technique, an example has been shown in which the wireless communication apparatus detects the communication quality about the network operator and uses it. However, it can be considered that the communication qualities about the plurality of network operators and positional relation have been previously stored in the wireless communication apparatus and contract authentication information (connection right) be switched by using them.

In the fourth embodiment of the present technique, an example is shown in which the contract authentication information (connection right) is switched by using the communication quality stored in the wireless communication apparatus. The wireless communication apparatus in the fourth embodiment of the present technique is a partially modified wireless communication apparatus 200 shown in FIG. 2 and the like. Therefore, the common parts are denoted with the same reference numerals as those of the wireless communication apparatus 200, and a part of the description regarding the common parts is omitted.

[Configuration Example of Wireless Communication Apparatus]

Figure 16:
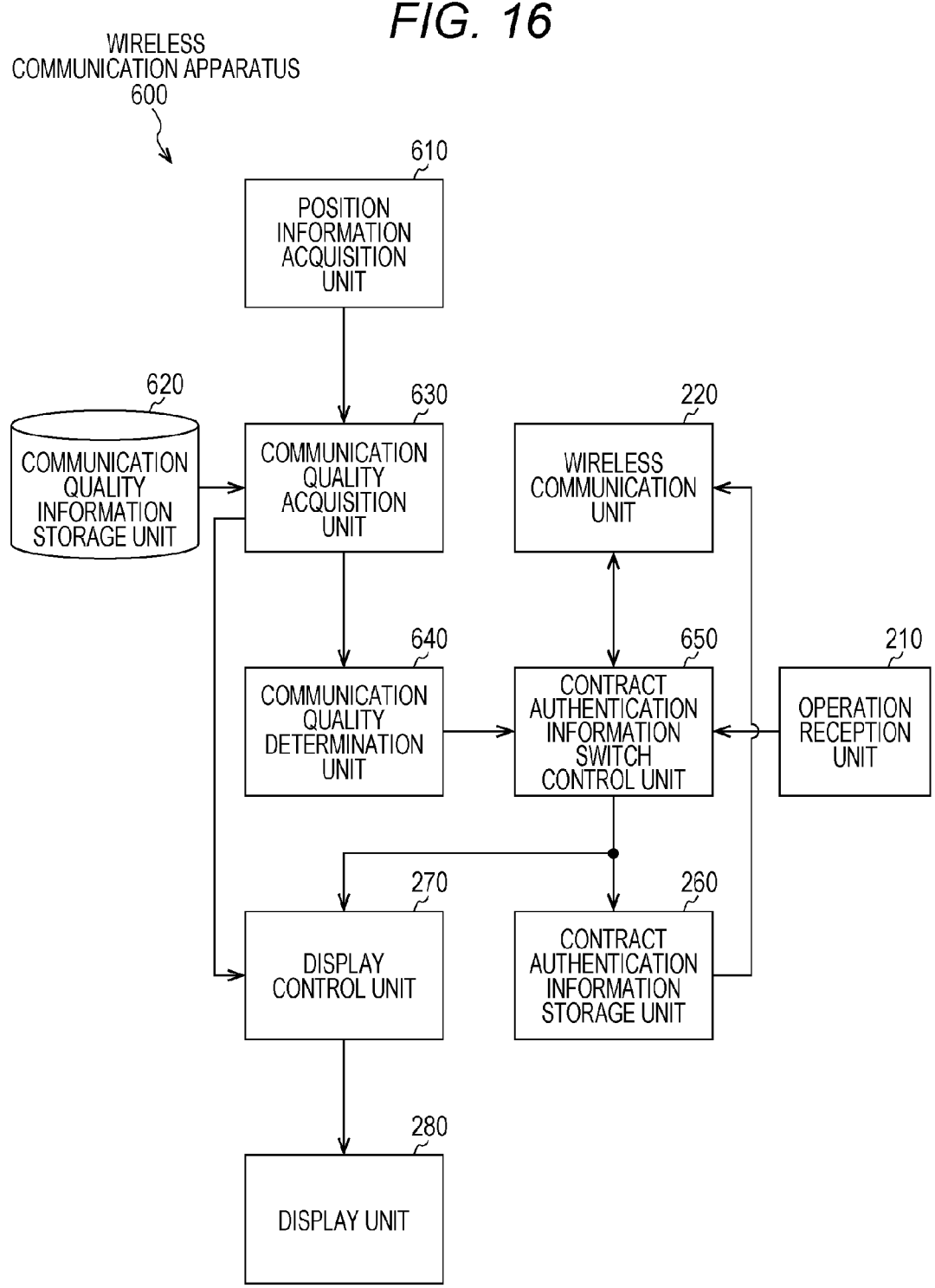
FIG. 16 is a block diagram of an exemplary function structure of a wireless communication apparatus 600 according to a fourth embodiment of the present technique.

FIG. 16 is a block diagram of an exemplary function structure of a wireless communication apparatus 600 according to the fourth embodiment of the present technique. In this example, a case where the network operator is switched by using position information is shown.

The wireless communication apparatus 600 includes a position information acquisition unit 610, a communication quality information storage unit 620, a communication quality acquisition unit 630, a communication quality determination unit 640, and a contract authentication information switch control unit 650.

The position information acquisition unit 610 obtains information about a position where the wireless communication apparatus 600 exists (a position where the wireless communication apparatus 600 is located) (position information) and outputs the obtained position information to the communication quality acquisition unit 630. The position information acquisition unit 610 is realized by, for example, a GPS receiver which receives a global positioning system (GPS) signal and calculates latitude, longitude, and altitude. Also, the position information acquisition unit 610 may obtain information about the position (position information) corresponding to identification information of the base station or an access point from the other information processor (for example, a server operated by the network operator regarding the contract authentication information).

The communication quality information storage unit 620 associates the communication qualities about the plurality of network operators with the position information and stores it. Then, the communication quality information storage unit 620 supplies the stored communication quality to the communication quality acquisition unit 630. The database may be previously stored in the communication quality information storage unit 620, and the database may be obtained from the other information processor (for example, the server operated by the network operator regarding the contract authentication information) via the wireless communication unit 220 and be updated at any time.

The communication quality acquisition unit 630 obtains the communication quality associated with the position information (the communication qualities about the plurality of network operators) from the communication quality information storage unit 620 based on the position information obtained by the position information acquisition unit 610. That is, the communication quality acquisition unit 630 obtains the communication quality associated with the position where the wireless communication apparatus 600 exists and stored. The communication quality acquisition unit 630 outputs the obtained communication quality to the communication quality determination unit 640.

The communication quality determination unit 640 determines the communication quality by comparing the communication qualities obtained by the communication quality acquisition unit 630 (the communication qualities about the plurality of network operators in an area where the wireless communication apparatus 600 exists). The communication quality determination unit 640 outputs the determination result to the contract authentication information switch control unit 650. For example, the communication quality determination unit 640 selects the network operator having the best communication quality from among the communication qualities obtained by the communication quality acquisition unit 630 and outputs the determination result including the selected network operator to the contract authentication information switch control unit 650.

The contract authentication information switch control unit 650 performs the control to switch the contract authentication information stored in the contract authentication information storage unit 260 based on the determination result by the communication quality determination unit 640. For example, when the determination result including the network operator selected as the network operator having the best communication quality has been output from the communication quality determination unit 640, the contract authentication information switch control unit 650 performs the control to switch the contract authentication information to that regarding the selected network operator. Also, the contract authentication information switch control unit 650 instructs the wireless communication unit 220 to change the setting of the wireless communication system, the carrier frequency, and the like so as to receive the communication service based on the contract authentication information after the switching.

[Example of Storage Content of Communication Quality Information Storage Unit]

FIG. 17 is a diagram of an exemplary database stored in the communication quality information storage unit 620 according to the fourth embodiment of the present technique. In FIG. 17, an example is shown in which the communication qualities of three network operators (first to third network operators) are stored.

The communication quality information storage unit 620 has stored a communication quality 623 of each network operator (first to third network operators) for each latitude 621 and longitude 622. Here, the communication quality may be classified in a scale of one to five and stored as shown in FIG. 17 and may be classified in an arbitrary scales of two or more and stored.

Also, a value such as a received signal strength, a signal to interference ratio, an Ec/No, and an Ec/Io may be stored as the communication quality. Similarly, a value such as an RSCP, an RSRP, and an RSRQ may be stored as the communication quality. Also, the number of the network operators is not limited to three and may be two or equal to or more than four. Also, the position information is not limited to the latitude and the longitude. An area equally or unequally divided based on the latitude and the longitude is set, and the area may be used as the position information.

[Operation Example of Wireless Communication Apparatus]

Figure 18:
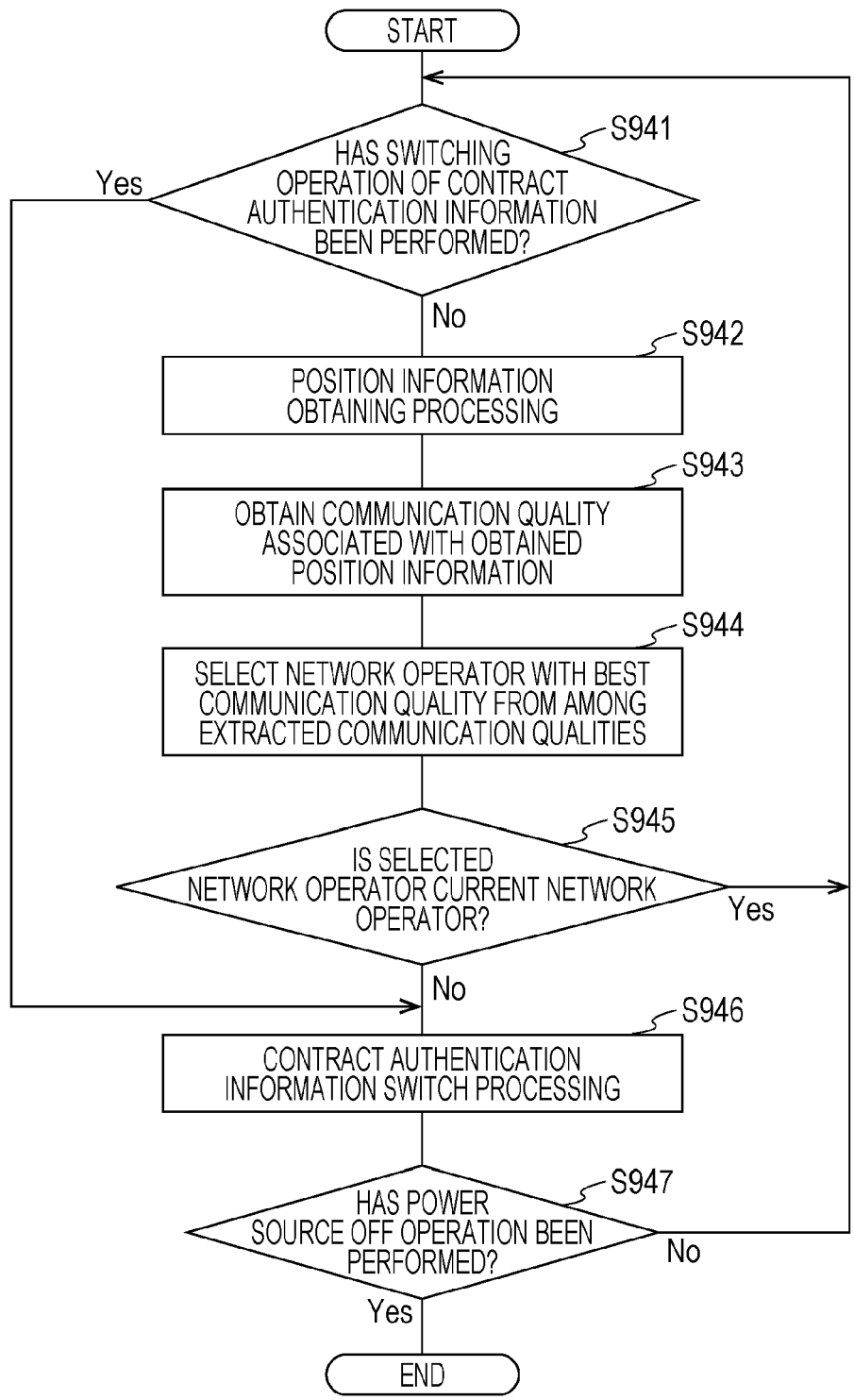
FIG. 18 is a flowchart of an exemplary procedure of contract authentication information switch processing by the wireless communication apparatus 600 according to the fourth embodiment of the present technique.

FIG. 18 is a flowchart of an exemplary procedure of the contract authentication information switch processing by the wireless communication apparatus 600 according to the fourth embodiment of the present technique.

When a power source of the wireless communication apparatus 600 is turned on, the contract authentication information switch control unit 650 determines whether the switching operation of the contract authentication information has been received by the operation reception unit 210 (step S941). When the switching operation has been received, the flow proceeds to step S946. On the other hand, when the switching operation has not been received (step S941), the position information acquisition unit 610 obtains the information about the position where the wireless communication apparatus 600 exists (a position where the wireless communication apparatus 600 is located) (position information) (step S942). The position information may be obtained at a fixed or variable period of time.

Subsequently, the communication quality acquisition unit 630 obtains the communication quality, which is associated with the position information obtained by the position information acquisition unit 610, from the communication quality information storage unit 620 (step S943). For example, when the position information obtained by the position information acquisition unit 610 has the latitude of "34.600" and the longitude of "135.015", the communication quality about each network operator (4, 3, 3) in a rectangle 625 indicated by a dotted line shown in FIG. 17 is obtained.

Subsequently, the communication quality determination unit 640 selects the network operator having the best communication quality from among the communication qualities obtained by the communication quality acquisition unit 630 (step S944). For example, the first network operator having the best communication quality is selected when the communication quality about each network operator (the first network operator is "four", the second network operator is "three", and the third network operator is "three") in the rectangle 625 indicated by the dotted line shown in FIG. 17 is obtained.

Subsequently, the contract authentication information switch control unit 650 determines whether the network operator selected by the communication quality determination unit 640 is the same as the network operator which is currently set (step S945). When the network operators are the same, the flow returns to step S941. On the other hand, when the network operators are not the same (step S945), the contract authentication information switch control unit 650 performs the control to switch the contract authentication information to that regarding the network operator selected by the communication quality determination unit 640 (step S946). That is, the contract authentication information switch processing from the contract authentication information which is currently set to that regarding the network operator selected by the communication quality determination unit 640 is performed. Subsequently, it is determined whether the power source off operation for turning off the power source of the wireless communication apparatus 600 has been performed (step S947). When the power source off operation has been performed, the operation of the contract authentication information switch processing is terminated, and when the power source off operation has not been performed, the flow returns to step S941.

[Example in which Network Operator is Switched by Using Position Information and Time Information]

An example has been shown above in which the communication quality in the area where the wireless communication apparatus exists is obtained based on the position information. Here, even in the same area, it can be assumed that the communication qualities in different time period be different from each other. For example, it is assumed that the communication qualities be different between daytime and nighttime in downtown and a residential area. An example is shown below in which the communication quality in the area where the wireless communication apparatus exists is obtained based on the position information and the time information.

[Configuration Example of Wireless Communication Apparatus]

Figure 19:
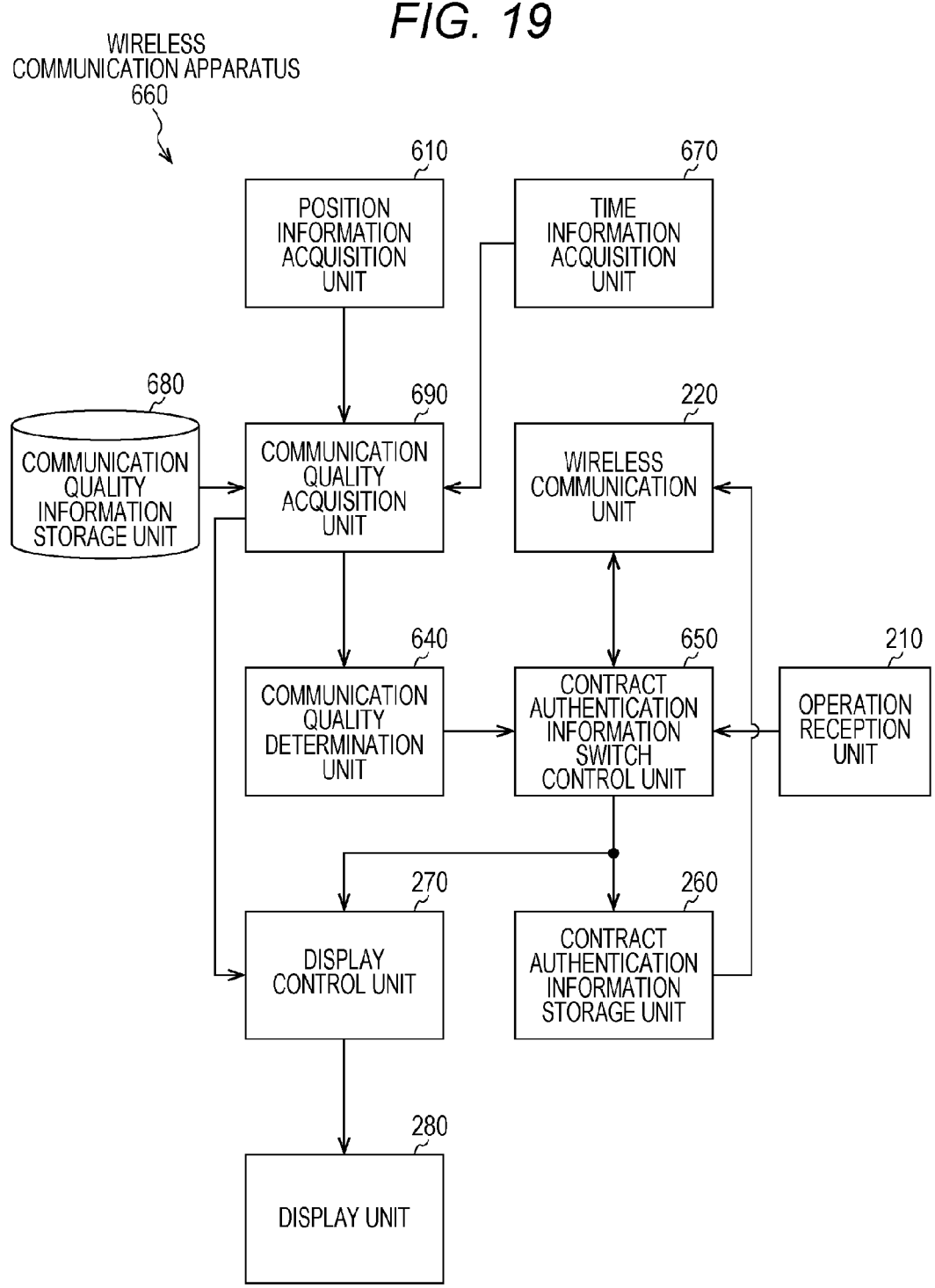
FIG. 19 is a block diagram of an exemplary function structure of a wireless communication apparatus 660 according to the fourth embodiment of the present technique.

FIG. 19 is a block diagram of an exemplary function structure of a wireless communication apparatus 660 according to the fourth embodiment of the present technique. The wireless communication apparatus 660 is a modification of the wireless communication apparatus 600 shown in FIG. 16. Therefore, the common parts are denoted with the same reference numerals as those of the wireless communication apparatus 600, and a part of the description regarding the common parts is omitted.

The wireless communication apparatus 660 includes a time information acquisition unit 670, a communication quality information storage unit 680, and a communication quality acquisition unit 690.

The time information acquisition unit 670 obtains information about current time (time information) and outputs the obtained time information to the communication quality acquisition unit 690.

The communication quality information storage unit 680 associates the communication qualities about the plurality of network operators with the position information and the time information and stores it. Then, the communication quality information storage unit 680 supplies the stored communication qualities to the communication quality acquisition unit 690. The database may be previously stored in the communication quality information storage unit 680, and the database may be obtained from the other information processor (for example, the server operated by the network operator regarding the contract authentication information) via the wireless communication unit 220 and be updated at any time.

The communication quality acquisition unit 690 obtains the communication quality from the communication quality information storage unit 680 based on the position information obtained by the position information acquisition unit 610 and the time information obtained by the time information acquisition unit 670. The communication quality is associated with the above position information and the time information. That is, the communication quality acquisition unit 690 obtains the communication quality associated with the position where the wireless communication apparatus 660 exists and the current time and stored. The communication quality acquisition unit 690 outputs the obtained communication quality to the communication quality determination unit 640.

[Example of Storage Content of Communication Quality Information Storage Unit]

FIG. 20 is a diagram of an exemplary database stored in the communication quality information storage unit 680 according to the fourth embodiment of the present technique. In FIG. 20, an example is shown in which the communication qualities of three network operators (first to third network operators) are stored. Since FIG. 20 is a modification of FIG. 17, a part of the description regarding the parts common to those of FIG. 17 is omitted.

The communication quality information storage unit 680 stores the communication qualities of each network operator (first to third network operators) classified by the latitude and the longitude and stored for each predetermined time period (for example, from 6:00 to 9:00, from 9:00 to 12:00, . . . ). In FIG. 20, the communication qualities about time periods 681 and 682 are shown, and the communication quality of the other time is not shown.

[Operation Example of Wireless Communication Apparatus]

Figure 21:
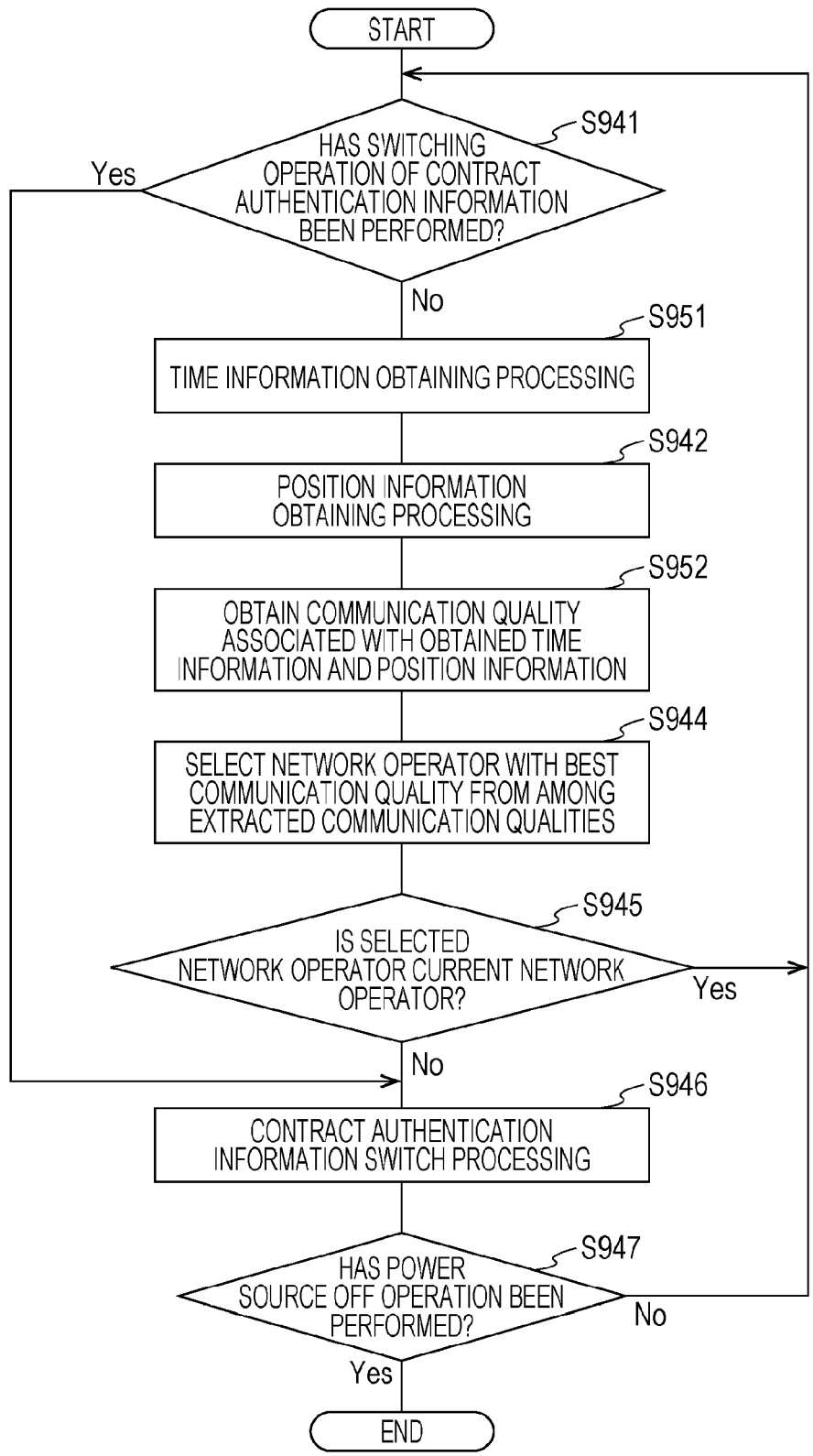
FIG. 21 is a flowchart of an exemplary procedure of contract authentication information switch processing by the wireless communication apparatus 660 according to the fourth embodiment of the present technique.

FIG. 21 is a flowchart of an exemplary procedure of the contract authentication information switch processing by the wireless communication apparatus 660 according to the fourth embodiment of the present technique. Since FIG. 21 is a modification of FIG. 18, the common parts are denoted with the same reference numerals as those of FIG. 18 and a part of the description regarding the common parts is omitted.

The time information acquisition unit 670 obtains the time information (current time) (step S951).

Also, the communication quality acquisition unit 690 obtains the communication quality from the communication quality information storage unit 680 (step S952). The communication quality is associated with the time information obtained by the time information acquisition unit 670 and the position information obtained by the position information acquisition unit 610. For example, a case is assumed where the time information obtained by the time information acquisition unit 670 is "7:15" and the position information obtained by the position information acquisition unit 610 has the latitude of "34.600" and the longitude of "135.015". In this case, the communication quality about each network operator (4, 3, 3) in a rectangle 685 indicated by the dotted line shown in FIG. 20 is obtained.

Time information obtaining processing (step S951) and position information obtaining processing (step S942) may be performed in reverse order and may be concurrently performed.

In this way, according to the fourth embodiment of the present technique, the communication qualities about the plurality of network operators and the position relation are previously stored in the wireless communication apparatus, and the contract authentication information (connection right) can be switched by using them.

5. Fifth Embodiment

In the first to fourth embodiments of the present technique, an example has been shown in which the wireless communication apparatus determines a switching timing of the contract authentication information (connection right). Here, the switching timing of the contract authentication information (connection right) may be determined by an apparatus other than the wireless communication apparatus.

In the fifth embodiment of the present technique, an example is shown in which the contract authentication information (connection right) of the wireless communication apparatus is switched based on the control by the apparatus (information processor) other than the wireless communication apparatus.

[Configuration Example of Communication System]

Figure 22:
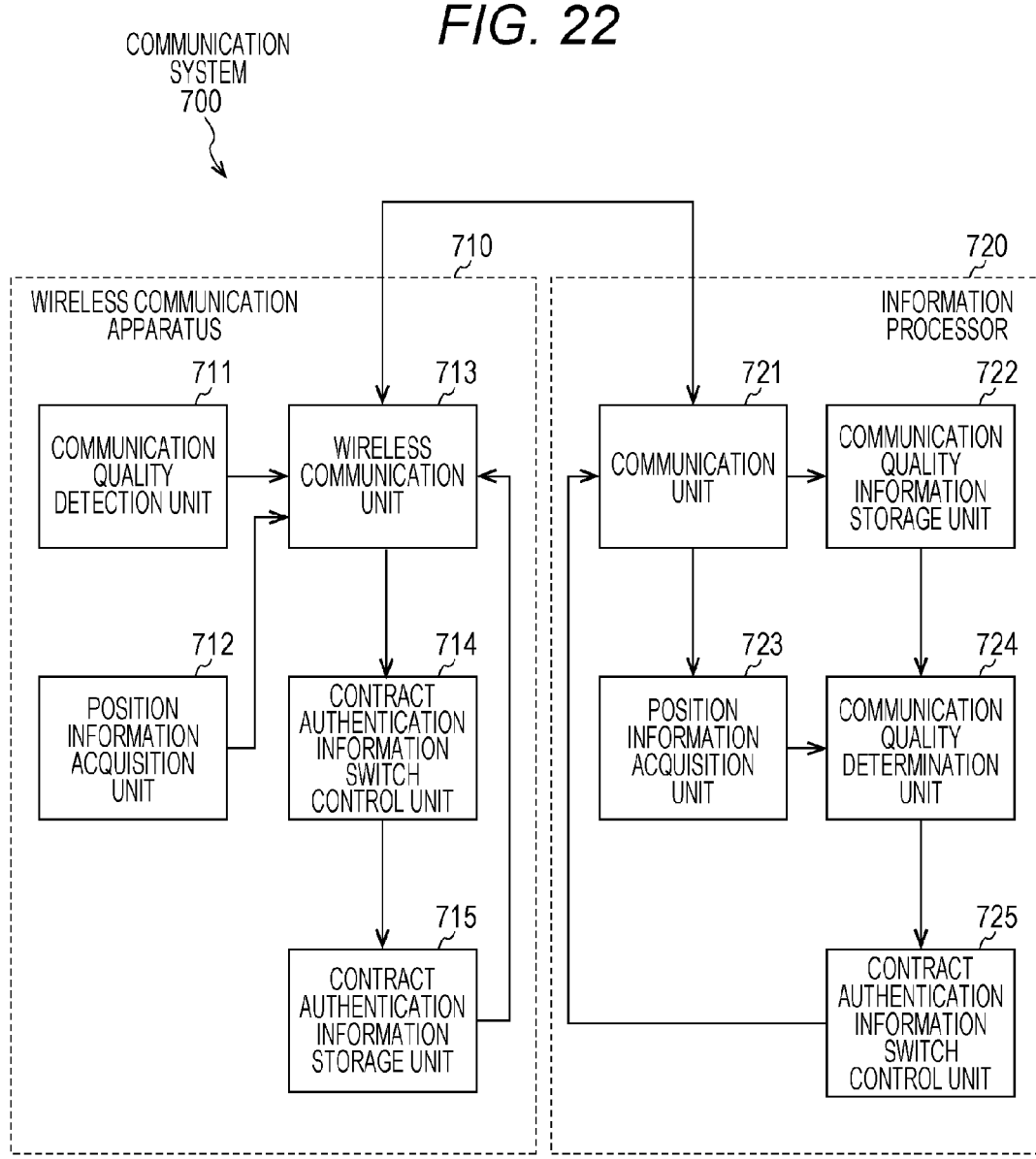
FIG. 22 is a block diagram of an exemplary function structure of a communication system 700 according to a fifth embodiment of the present technique.

FIG. 22 is a block diagram of an exemplary function structure of a communication system 700 according to the fifth embodiment of the present technique.

A communication system 700 includes a wireless communication apparatus 710 and an information processor 720. The wireless communication apparatus 710 is a modification of the wireless communication apparatus 200 shown in FIG. 1, and the information processor 720 is a modification of the information processor 140 shown in FIG. 1. Also, the wireless communication apparatus 710 and the information processor 720 are connected via a communication control apparatus and a base station. For easier description, these are not shown in FIG. 22.

The wireless communication apparatus 710 includes a communication quality detection unit 711, a position information acquisition unit 712, a wireless communication unit 713, a contract authentication information switch control unit 714, and a contract authentication information storage unit 715. These units correspond to the units, which have the same names, in the first to fourth embodiments of the present technique. Therefore, a point different from the first to fourth embodiments of the present technique will be mainly described below, and the other description will be omitted.

The communication quality detection unit 711 detects the communication quality and outputs it to the wireless communication unit 713. Also, the position information acquisition unit 712 obtains information about a position where the wireless communication apparatus 710 exists (position information) and outputs it to the wireless communication unit 713.

The wireless communication unit 713 associates the information about the communication quality (communication quality information) detected by the communication quality detection unit 711 with the position information obtained by the position information acquisition unit 712 and transmits it to the information processor 720. The transmission is performed by using the wireless communication. Also, the transmission is performed, for example, at a fixed or variable period of time.

The information processor 720 includes a communication unit 721, a communication quality information storage unit 722, a position information acquisition unit 723, a communication quality determination unit 724, and a contract authentication information switch control unit 725.

The communication unit 721 receives the position information and the communication quality information transmitted from the plurality of wireless communication apparatuses (including the wireless communication apparatus 710) and makes the communication quality information storage unit 722 store the received position information and communication quality information. Also, the communication unit 721 transmits an instruction to switch the contract authentication information to the wireless communication apparatus 710 based on the control of the contract authentication information switch control unit 725.

The communication quality information storage unit 722 classifies the position information and the communication quality information transmitted from the plurality of wireless communication apparatuses (including the wireless communication apparatus 710) for each position information and stores it. Then, the communication quality information storage unit 722 supplies each stored information to the communication quality determination unit 724. For example, when the communication quality information detected in the same position (or same area) has been transmitted from the plurality of wireless communication apparatuses, a predetermined calculation regarding the communication quality information (for example, calculation of the average value) is performed. Then, the calculation result is associated with the position and stored.

The position information acquisition unit 723 obtains the position information transmitted from the plurality of wireless communication apparatuses (including the wireless communication apparatus 710) and manages it for each wireless communication apparatus. The position information acquisition unit 723 supplies the managed position information to the communication quality determination unit 724.

The communication quality determination unit 724 refers to the communication quality information stored in the communication quality information storage unit 722 based on the position information obtained by the position information acquisition unit 723 and determines whether the switching of the contract authentication information of the wireless communication apparatus corresponding to the position information is necessary.

For example, the communication quality determination unit 724 obtains the communication quality information stored in the communication quality information storage unit 722 while associating it with the position information obtained by the position information acquisition unit 723 and determines for each wireless communication apparatus whether the communication quality information satisfies the predetermined condition. For example, it is determined whether the communication quality is lower than the threshold. When the communication quality is equal to or more than the threshold, it is determined that the switching of the contract authentication information of the wireless communication apparatus is not necessary. On the other hand, when the communication quality is lower than the threshold, it is determined that the switching of the contract authentication information of the wireless communication apparatus is necessary. The communication quality determination unit 724 outputs the determination result to the contract authentication information switch control unit 725.

The contract authentication information switch control unit 725 performs the control to switch the contract authentication information of the wireless communication apparatus based on the determination result output from the communication quality determination unit 724. For example, the contract authentication information switch control unit 725 transmits the instruction to switch the contract authentication information to the wireless communication apparatus via the communication unit 721 when the communication quality determination unit 724 has output the determination result that it is necessary to switch the contract authentication information of the wireless communication apparatus.

When the wireless communication unit 713 has received the instruction to switch the contract authentication information, the switching instruction is output to the contract authentication information switch control unit 714. The contract authentication information switch control unit 714 performs the control to switch the contract authentication information corresponding to the switching instruction. When it is necessary, the wireless communication apparatus 710 may perform the control to switch at least one of the carrier frequency and the wireless communication system according to the control to switch the contract authentication information to that corresponding to the switching instruction.

Communication Example

Figure 23:
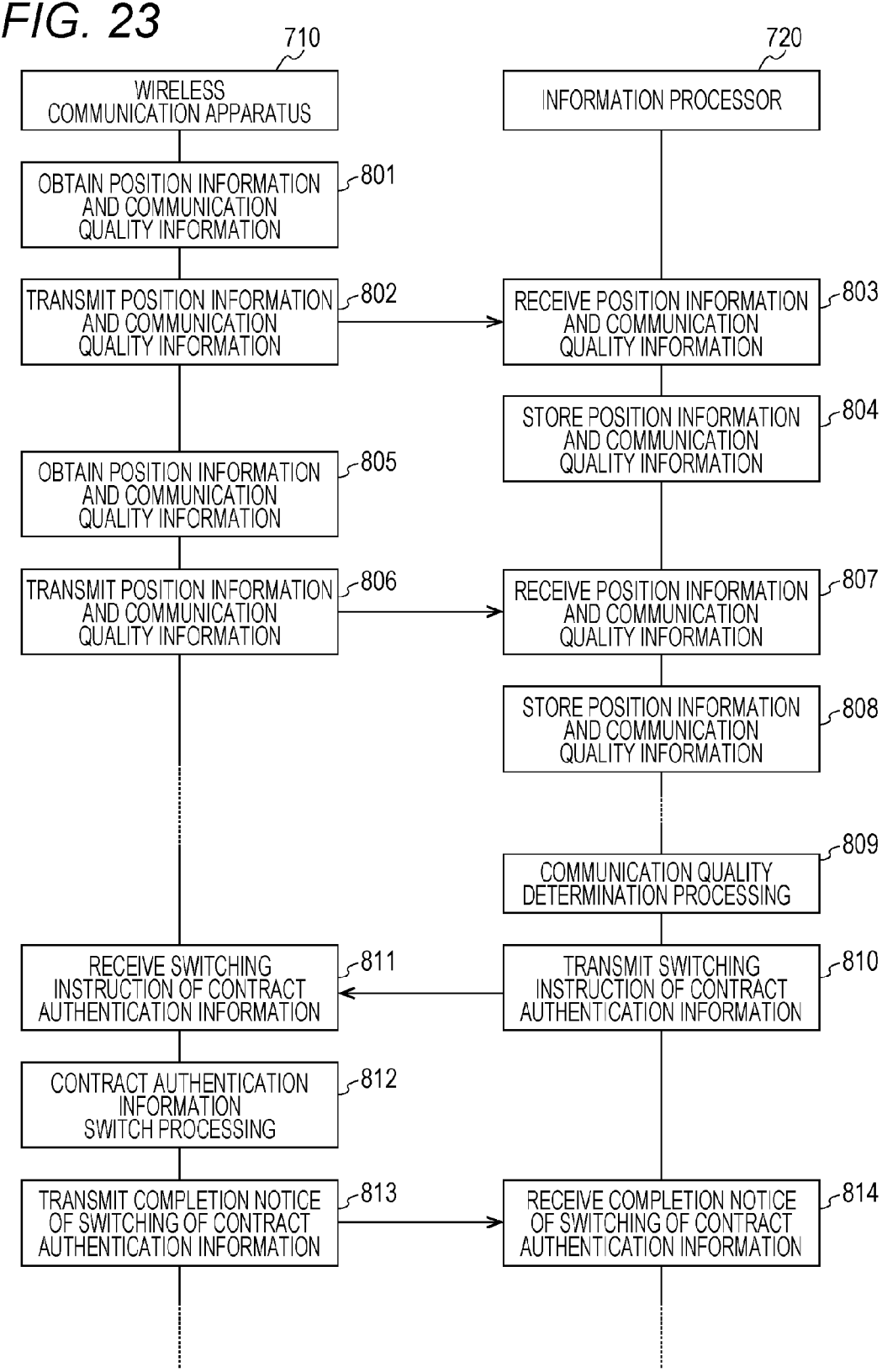
FIG. 23 is a sequence chart of exemplary communication processing between apparatuses included in the communication system 700 according to the fifth embodiment of the present technique.

FIG. 23 is a sequence chart of exemplary communication processing between apparatuses included in the communication system 700 according to the fifth embodiment of the present technique. In FIG. 23, an example is shown in which the transmission of the position information and the communication quality information and communication quality determination processing are performed at a fixed or variable period of time. The wireless communication apparatus 710 and the information processor 720 are connected via the base station and the communication control apparatus. However, for easier description, the base station and the communication control apparatus are not shown in FIG. 23.

The wireless communication apparatus 710 obtains the position information and the communication quality information at the fixed or variable period of time (801). Timings for obtaining these may be the same and may be different from each other.

Subsequently, the wireless communication apparatus 710 associates the obtained position information with the communication quality information and transmits it to the information processor 720 at the fixed or variable period of time (802 and 803).

Similarly, the wireless communication apparatus 710 obtains the position information and the communication quality information (805) and transmits them (806 and 807). Also, after that, the position information and the communication quality information are obtained, and the position information and the communication quality information are transmitted.

When receiving the position information and the communication quality information, the information processor 720 classifies the received position information and the communication quality information for each position information, and the communication quality information storage unit 722 stores it (804 and 808).

Also, the communication quality determination unit 724 of the information processor 720 determines the communication quality regarding the position information based on the received position information (809). This determination is performed at the fixed or variable period of time. As a result of the determination, when it has been determined that the switching of the contract authentication information is necessary, the contract authentication information switch control unit 725 transmits the instruction to switch the contract authentication information to the wireless communication apparatus 710 (810 and 811).

When the wireless communication apparatus 710 has received the instruction to switch the contract authentication information (811), the contract authentication information switch control unit 714 performs the control to switch the contract authentication information to that corresponding to the switching instruction (812). That is, the contract authentication information is set so that the communication service about the network operator corresponding to the switching instruction can be received. When the setting has finished, the wireless communication apparatus 710 transmits a completion notice of switching of the contract authentication information to the information processor 720 (813 and 814).

In this way, the wireless communication unit 713 transmits the communication quality of the wireless communication at the position where the wireless communication apparatus 710 exists to the information processor 720. Also, the contract authentication information switch control unit 714 switches the contract authentication information based on a switching request of the contract authentication information from the information processor 720. Also, the contract authentication information switch control unit 725 transmits the switching request of the contract authentication information to the wireless communication apparatus 710 based on the communication quality transmitted from the wireless communication apparatus 710.

In this way, in the fifth embodiment of the present technique, the contract authentication information (connection right) of the wireless communication apparatus 710 can be switched based on the control of the apparatus (information processor 720) other than the wireless communication apparatus. That is, the information processor 720 can perform each processing which can be performed by the information processor 720 (obtaining the communication quality and controlling the switching of the contract authentication information (connection right)). Also, the information processing system may perform each processing which can be performed by the information processing system existing on the network (obtaining the communication quality and controlling the switching of the contract authentication information (connection right)). The information processing system existing on the network is a system including one or a plurality of apparatuses, and cloud computing is expected.

Here, in a current mobile service in Japan, the user subscribes to each network operator, and the user is basically allowed to use a mobile telephone network of the network operator to which the user subscribes. On the other hand, overseas, the user respectively subscribes to a plurality of network operators. The user inserts a plurality of USIMs to a single wireless communication apparatus and switches and uses the USIMs according to the area. Even in the same area, it is preferable that the user can dynamically select the plurality of wireless communication networks from which the use can receive the radio waves and use it regardless of the kind of the network operator and the transmission system. In this case, it becomes important that the user easily selects the single wireless communication network from among the plurality of wireless communication networks which can be used by the user. Especially, the congestion of the traffic, which is generated by the local concentration of the users, dynamically occurs. Therefore, it is difficult to select the single wireless communication network by monitoring the received signal strength RSSI as represented by an antenna bar.

In the embodiments of the present technique, the wireless communication apparatus existing in an environment where a plurality of wireless communication services can be used selects the optimal wireless communication service and sets it. That is, the contract authentication information can be appropriately switched based on the communication quality (for example, the degree of congestion of the base station). Also, the optimal wireless communication network can be easily provided to the user by constantly watching the plurality of wireless communication networks and controlling the switching.

For example, the degree of the congestion, which dynamically changes according to the situation of the traffic, of the base station is detected. When the degree of the congestion is equal to or lower than a certain quality, the contract authentication information is switched and the quality of the wireless communication network of other network operator is monitored. Also, for example, when the communication quality after the switching is deteriorated from that before the switching, the setting of the contract authentication information is restored to the original one. On the other hand, when the communication quality is not deteriorated from that before the switching, the control is performed in which the setting of the contract authentication information is maintained until the communication quality becomes equal to or lower than the certain communication quality. By continuously performing these processing in idle mode, the user can communicate by using the best wireless communication network when starting the wireless communication.

The embodiments of the present technique can be applied to another portable wireless communication apparatus (for example, a data communication exclusive terminal apparatus) and a fixed wireless communication apparatus (for example, a wireless communication apparatus having a purpose of collecting data of a vending machine).

Also, in the embodiments of the present technique, an example has been shown in which the information about the detected communication quality (communication quality information) is associated with the information about the network operator (network operator information) and the display unit 280 displays it. However, for example, the communication quality information is associated with the network operator information, and then, an audio output unit of the wireless communication apparatus (for example, a speaker) may output it. Also, an electronic device connected to the wireless communication apparatus (for example, external audio output device and an external display device) may output the communication quality information and the network operator information. In this case, the wireless communication apparatus transmits the communication quality information and the network operator information to the electronic device, and the electronic device outputs third information and the like.

The above-mentioned embodiments are exemplified to realize the present technique, and matters in the embodiments correspond to matters used to specify the invention in claims. Similarly, the matters used to specify the invention in claims respectively correspond to the matters in the embodiments of the present technique having the same names as those in claims. However, the present technique is not limited to the embodiments and can be realized by variously modifying the embodiments without departing from the scope of the invention.

Also, the procedure described in the above-mentioned embodiments may be understood as a method having the series of the procedures and also as a program to make the computer perform the series of the procedures and recording media for storing the program. As the recording media, for example, a hard disk, a compact disc (CD), a minidisc (MD), and a digital versatile disk (DVD) can be used. Also, a memory card, a Blu-ray disc (registered trademark), and the like can be used.

The present technique may have the following configuration.

(1)
An information processor including:
an acquisition unit configured to obtain a communication quality of wireless communication at a position where a wireless communication apparatus exists; and
a control unit configured to switch connection rights to connect the wireless communication apparatus to a base station by using the wireless communication based on the obtained communication quality.

(2)
The information processor according to (1), wherein
the control unit switches the connection right to another connection right when the communication quality of the wireless communication based on the connection right satisfies a predetermined condition.

(3)
The information processor according to (2), wherein
the control unit determines that the predetermined condition is satisfied when the communication quality of the wireless communication based on the connection right is worse than a threshold as a reference.

(4)
The information processor according to (1), wherein
the acquisition unit sequentially obtains the communication qualities regarding the plurality of connection rights for each connection right, and
the control unit switches the connection right to the connection right regarding the communication quality for satisfying a predetermined condition from among the obtained communication qualities.

(5)
The information processor according to any of (1) to (4), wherein
the control unit switches the connection right regardless of the obtained communication quality when the position where the wireless communication apparatus exists is out of a communication range.

(6)
The information processor according to (5), wherein
when a state of out of the communication range continues for a predetermined period of time, the control unit does not switch the connection right until the state of out of the communication range is cleared.

(7)
The information processor according to any of (1) to (6), wherein
the control unit changes at least one of settings of a carrier frequency and a wireless communication system of a wireless communication unit for performing the wireless communication with the base station according to the switching of the connection right.

(8)
The information processor according to (1), wherein
the control unit makes a hold unit hold the communication quality obtained at the time of or immediately before the switching of the connection right and determines after the switching whether to switch connection right based on the comparison result between the communication quality obtained after the switching and the communication quality held by the hold unit.

(9)
The information processor according to any of (1) to (8), wherein
the acquisition unit obtains a value calculated based on a value regarding a strength of a pilot signal, a reference signal, or a beacon signal and a received signal strength as the communication quality.

(10)
The information processor according to any of (1) to (8), wherein
the acquisition unit obtains a value calculated based on a value regarding an energy per chip-to-noise power spectral density (Ec/No), an energy per chip-to-interference power spectral density (Ec/Io), or a signal-to-interference ratio (SIR) as the communication quality.

(11)
The information processor according to any of (1) to (8), wherein
the acquisition unit obtains a value calculated based on a value regarding a channel quality indicator (CQI) or a data rate control (DRC) as the communication quality.

(12)
The information processor according to any of (1) to (8), wherein
the acquisition unit obtains the communication quality included in information provided from another information processor via the base station.

(13)
The information processor according to any of (1) to (8), wherein
the acquisition unit obtains a communication quality associated with the position where the wireless communication apparatus exists and stored or a communication quality associated with the position where the wireless communication apparatus exists and the current time and stored.

(14)
The information processor according to any of (1) to (13), wherein
acquisition processing by the acquisition unit and switching processing by the control unit are performed in idle mode.

(15)
The information processor according to any of (1) to (14), further including:
a display control unit configured to associate the obtained communication quality with information about a network operator for providing the communication quality and display it on a display unit.

(16)
The information processor according to any of (1) to (15), wherein
the control unit switches the connection right according to operation by a user regardless of the obtained communication quality when the operation by the user to switch the connection right has been received.

(17)
The information processor according to any of (1) to (16), wherein
the connection right is a right to connect to the base station based on contract authentication information regarding a network operator for operating the base station, and the control unit switches the connection right by switching the contract authentication information.

(18)
A communication system including:
a wireless communication apparatus configured to include a wireless communication unit for transmitting a communication quality of wireless communication at a position where the wireless communication apparatus exists to an information processor and a control unit for switching a connection right to connect to a base station by using the wireless communication based on a switching request from the information processor; and
an information processor configured to transmit the switching request to switch the connection right to the wireless communication apparatus based on the communication quality transmitted from the wireless communication apparatus.

(19)
An information processing method including:
an acquisition procedure configured to obtain a communication quality of wireless communication at a position where a wireless communication apparatus exists; and
a control procedure configured to switch a connection right to connect the wireless communication apparatus to a base station by using the wireless communication based on the obtained communication quality.

(20)
A program for making a computer perform an acquisition procedure for obtaining a communication quality of wireless communication at a position where a wireless communication apparatus exists and a control procedure for switching a connection right to connect the wireless communication apparatus to a base station by using the wireless communication based on the obtained communication quality.

REFERENCE SIGNS LIST 100 communication system
110 public line network
120 first communication control apparatus
121, 131 base station
122, 132 cell
130 second communication control apparatus
140 information processor
141 communication unit
142 contract authentication information storage unit
200 wireless communication apparatus
210 operation reception unit
220 wireless communication unit
230 communication quality detection unit
240 communication quality determination unit
250 contract authentication information switch control unit
260 contract authentication information storage unit
270 display control unit
280 display unit
400 wireless communication apparatus
410 communication quality holding unit
420 communication quality determination unit
430 contract authentication information switch control unit
500 wireless communication apparatus
510 communication quality detection unit
520 communication quality holding unit
530 communication quality determination unit
540 switching period setting unit
550 contract authentication information switch control unit
560 communication quality determination instruction unit
600 wireless communication apparatus
610 position information acquisition unit
620 communication quality information storage unit
630 communication quality acquisition unit
640 communication quality determination unit
650 contract authentication information switch control unit
660 wireless communication apparatus
670 time information acquisition unit
680 communication quality information storage unit
690 communication quality acquisition unit
700 communication system
710 wireless communication apparatus
711 communication quality detection unit
712 position information acquisition unit
713 wireless communication unit
714 contract authentication information switch control unit
715 contract authentication information storage unit
720 information processor
721 communication unit
722 communication quality information storage unit
723 position information acquisition unit
724 communication quality determination unit
725 contract authentication information switch control unit

The invention claimed is:

1. A first information processor, comprising:
an acquisition unit configured to obtain, from a wireless communication apparatus, a communication quality of wireless communication at a position of the wireless communication apparatus; and
a control unit configured to:
switch a connection right from a first connection right to a second connection right based on the wireless communication apparatus that is out of a first communication range of a first base station corresponding to the first connection right,
wherein the wireless communication apparatus is connected to a second base station corresponding to the second connection right after the switch from the first connection right to the second connection right; and
switch, based on the wireless communication apparatus that is out of a second communication range of the second base station after the switch from the first connection right to the second connection right, the connection right from the second connection right to a third connection right,
wherein the switch of the connection right from the second connection right corresponding to the second base station to the third connection right is based on movement of the wireless communication apparatus into the second communication range of the second base station.

2. The first information processor according to claim 1, wherein the control unit is further configured to change at least one setting of a carrier frequency of a wireless communication unit for the wireless communication with the second base station, wherein the change of the at least one setting is based on the switch of the connection right from the first connection right to the second connection right.

3. The first information processor according to claim 1, wherein the acquisition unit is further configured to obtain a first value calculated based on a second value and a received signal strength as the communication quality, wherein the second value corresponds to at least one of a strength of a pilot signal, a reference signal, or a beacon signal.

4. The first information processor according to claim 1, wherein the acquisition unit is further configured to obtain a first value calculated based on a second value, wherein the second value corresponds to at least one of an energy per chip-to-noise power spectral density (Ec/No), an energy per chip-to-interference power spectral density (Ec/Io), or a signal-to-interference ratio (SIR) as the communication quality.

5. The first information processor according to claim 1, wherein the acquisition unit is further configured to obtain a first value calculated based on a second value, wherein the second value corresponds to at least one of a channel quality indicator (CQI) or a data rate control (DRC) as the communication quality.

6. The first information processor according to claim 1, wherein the acquisition unit is further configured to obtain the communication quality included in information from a second information processor via the second base station.

7. The first information processor according to claim 1, wherein the acquisition unit is further configured to obtain the communication quality and the control unit is further configured to switch from the first connection right and from the second connection right in an idle mode.

8. The first information processor according to claim 1, further comprising:
a display control unit configured to:
associate the obtained communication quality with information of a network operator; and
display the obtained communication quality on a display unit.

9. The first information processor according to claim 1, wherein the control unit is further configured to switch the connection right based on operation by a user regardless of the obtained communication quality.

10. The first information processor according to claim 1, wherein the connection right is a right to connect to the second base station based on contract authentication information related to a network operator to operate the second base station, and
wherein the control unit is further configured to switch the contract authentication information to switch the connection right.

11. The first information processor according to claim 1, wherein the acquisition unit is further configured to resume detection of the communication quality after a period of time elapses from a time the wireless communication apparatus moves out of the first communication range.

12. The first information processor according to claim 1, wherein the communication quality comprises effective communication speed of the wireless communication apparatus.

13. A communication system, comprising:
a wireless communication apparatus that includes:
a wireless communication unit configured to transmit a communication quality of wireless communication, at a position of the wireless communication apparatus, to an information processor;
a control unit configured to:
switch a connection right from a first connection right to a second connection right, based on the wireless communication apparatus that is out of a first communication range of a first base station that corresponds to the first connection right,
wherein the connection right is switched to connect to a second base station by use of the wireless communication based on a request to switch from the information processor,
wherein the second base station corresponds to the second connection right, and
switch, based on the wireless communication apparatus that is out of a second communication range of the second base station after the switch from the first connection right to the second connection right, the connection right from the second connection right to a third connection right,
wherein the switch of the connection right from the second connection right corresponding to the second base station to the third connection right is based on movement of the wireless communication apparatus into the second communication range of the second base station; and
the information processor that is configured to transmit the request, to switch the connection right from the first connection right to the second connection right, to the wireless communication apparatus, wherein the request is transmitted based on the communication quality that is less than a threshold.

14. An information processing method, comprising:
- obtaining, from a wireless communication apparatus, a communication quality of wireless communication at a position of the wireless communication apparatus;
- switching a connection right from a first connection right to a second connection right based on the wireless communication apparatus that is out of a first communication range of a first base station corresponding to the first connection right,
- wherein the wireless communication apparatus is connected to a second base station corresponding to the second connection right after the switching from the first connection right to the second connection right; and
- switching, based on the wireless communication apparatus that is out of a second communication range of the second base station after the switching from the first connection right to the second connection right, the connection right from the second connection right to a third connection right
- wherein the switch of the connection right from the second connection right corresponding to the second base station to the third connection right is based on movement of the wireless communication apparatus into the second communication range of the second base station.

15. A non-transitory computer-readable medium having stored thereon computer-executable instructions that, when executed by a computer, cause the computer to execute operations, the operations comprising:
- obtaining, from a wireless communication apparatus, a communication quality of wireless communication at a position of the wireless communication apparatus;
- switching a connection right from a first connection right to a second connection right based on the wireless communication apparatus that is out of a first communication range of a first base station corresponding to the first connection right,
- wherein the wireless communication apparatus is connected to a second base station corresponding to the second connection right after the switching from the first connection right to the second connection right; and
- switching, based on the wireless communication apparatus that is out of a second communication range of the second base station after the switching from the first connection right to the second connection right, the connection right from the second connection right to a third connection right,
- wherein the switch of the connection right from the second connection right corresponding to the second base station to the third connection right is based on movement of the wireless communication apparatus into the second communication range of the second base station.

\* \* \* \* \*